(12) United States Patent
Korenaga et al.

(10) Patent No.: US 12,019,393 B2
(45) Date of Patent: Jun. 25, 2024

(54) ELECTROPHOTOGRAPHIC PHOTOCONDUCTOR, PROCESS CARTRIDGE, AND IMAGE FORMING APPARATUS

(71) Applicant: FUJIFILM Business Innovation Corp., Tokyo (JP)

(72) Inventors: Jiro Korenaga, Ebina (JP); Shuhei Yamazaki, Ebina (JP); Satoshi Mizoguchi, Ebina (JP); Yoichi Kigoshi, Ebina (JP); Michinori Fukuma, Ebina (JP); Kosuke Narita, Ebina (JP); Masahiro Iwasaki, Minamiashigara (JP); Keisuke Kusano, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 288 days.

(21) Appl. No.: 17/397,215

(22) Filed: Aug. 9, 2021

(65) Prior Publication Data
US 2022/0308475 A1    Sep. 29, 2022

(30) Foreign Application Priority Data

Mar. 25, 2021    (JP) ................ 2021-052442

(51) Int. Cl.
| | |
|---|---|
| *G03G 21/16* | (2006.01) |
| *G03G 5/047* | (2006.01) |
| *G03G 5/05* | (2006.01) |
| *G03G 5/07* | (2006.01) |
| *G03G 21/18* | (2006.01) |

(Continued)

(52) U.S. Cl.
CPC .............. *G03G 5/07* (2013.01); *G03G 5/047* (2013.01); *G03G 5/0525* (2013.01);
(Continued)

(58) Field of Classification Search
CPC .... G03G 5/047; G03G 5/0525; G03G 5/0539; G03G 5/07; G03G 5/071; G03G 5/14;
(Continued)

(56) References Cited

U.S. PATENT DOCUMENTS

| | | |
|---|---|---|
| 10,705,441 B1 | 7/2020 | Fujii et al. |
| 2014/0127616 A1 | 5/2014 | Wu |

(Continued)

FOREIGN PATENT DOCUMENTS

| | | |
|---|---|---|
| JP | 3943310 B2 | 7/2007 |
| JP | 4425487 B2 | 3/2010 |

(Continued)

OTHER PUBLICATIONS

Communication dated Jan. 31, 2022 issued by the European Patent Office in counterpart European Application No. 21193385.8.

(Continued)

*Primary Examiner* — Hoang X Ngo
(74) *Attorney, Agent, or Firm* — Sughrue Mion, PLLC

(57) ABSTRACT

An electrophotographic photoconductor includes a conductive substrate, and a photoconductive layer, in which an outermost surface layer contains a binder resin, a charge transporting material, fluorine-containing resin particles, and an acidic compound, the number of carboxyl groups in the fluorine-containing resin particles is 0 or more and 30 or less per $10^6$ carbon atoms of the fluorine-containing resin particles, and in a case where charging and exposure of the electrophotographic photoconductor are repeated 10,000 times under conditions of a charging potential of −700 V and an exposure intensity of 5 mJ/m², an absolute value $|RP_1 - RP_{10000}|$ of a difference between a residual potential $RP_1$ after charging and exposure once and a residual potential $RP_{10000}$ after charging and exposure 10,000 times is 25 V or less.

21 Claims, 3 Drawing Sheets

(51) Int. Cl.
*B82Y 20/00* (2011.01)
*B82Y 30/00* (2011.01)
*B82Y 40/00* (2011.01)

(52) U.S. Cl.
CPC .......... *G03G 21/1814* (2013.01); *B82Y 20/00* (2013.01); *B82Y 30/00* (2013.01); *B82Y 40/00* (2013.01)

(58) Field of Classification Search
CPC ........... G03G 5/14726; G03G 21/1814; B82Y 20/00; B82Y 30/00; B82Y 40/00
See application file for complete search history.

(56) References Cited

U.S. PATENT DOCUMENTS

| | | | |
|---|---|---|---|
| 2015/0017580 A1 | 1/2015 | Fukushima et al. | |
| 2021/0080843 A1* | 3/2021 | Sasaki | G03G 5/14791 |

FOREIGN PATENT DOCUMENTS

| | | | |
|---|---|---|---|
| JP | 2014-56107 A | 3/2014 | |
| JP | 2015-18036 A | 1/2015 | |
| JP | 2015-105972 A | 6/2015 | |
| JP | 2020-129058 A | 8/2020 | |

OTHER PUBLICATIONS

Communication dated Jun. 16, 2023 issued by the European Patent Office in counterpart European Patent Application No. 21193385.8.

* cited by examiner

ELECTROPHOTOGRAPHIC PHOTOCONDUCTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-052442 filed on Mar. 25, 2021.

BACKGROUND

Technical Field

The present invention relates to an electrophotographic photoconductor, a process cartridge, and an image forming apparatus.

Related Art

Japanese Patent No. 4425487 proposes "an electrophotographic photoconductor including, on a conductive support, a photoconductive layer containing at least a charge generating substance and a charge transporting substance, in which a protective layer containing at least a filler and a dispersant is formed on the photoconductive layer, and a concentration of the dispersant contained in the protective layer has a concentration change in which the concentration in an outermost surface region of the protective layer is the lowest, and the dispersant contained in the protective layer is an organic compound containing at least one or more carboxyl groups in a structure".

SUMMARY

Aspects of non-limiting embodiments of the present disclosure relate to an electrophotographic photoconductor capable of preventing a decrease in the image density uniformity when image formation is continuously performed, then paused, and image formation is performed again, as compared with a case where, in an electrophotographic photoconductor including a conductive substrate, and a photoconductive layer, in which an outermost surface layer of the electrophotographic photoconductor contains a binder resin, a charge transporting material, and fluorine-containing resin particles, and the number of carboxyl groups in the fluorine-containing resin particles is 0 or more and 30 or less per $10^6$ carbon atoms of the fluorine-containing resin particles, the following absolute value ($|RP_1-RP_{10000}|$) is more than 25 V, or a content of the charge transporting material in the outermost surface layer is less than 59 mass % or more than 72 mass % with respect to the binder resin.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrophotographic photoconductor including:
a conductive substrate; and
a photoconductive layer, in which an outermost surface layer of the electrophotographic photoconductor contains a binder resin, a charge transporting material, fluorine-containing resin particles, and an acidic compound, the number of carboxyl groups in the fluorine-containing resin particles is 0 or more and 30 or less per $10^6$ carbon atoms of the fluorine-containing resin particles, and in a case where charging and exposure of the electrophotographic photoconductor are repeated 10,000 times under conditions of a charging potential of −700 V and an exposure intensity of 5 mJ/m$^2$, an absolute value $|RP_1-RP_{10000}|$ of a difference between a residual potential $RP_1$ after charging and exposure once and a residual potential $RP_{10000}$ after charging and exposure 10,000 times is 25 V or less.

BRIEF DESCRIPTION OF THE DRAWINGS

Exemplary embodiment(s) of the present invention will be described in detail based on the following figures, wherein.

DETAILED DESCRIPTION

Figure 1:
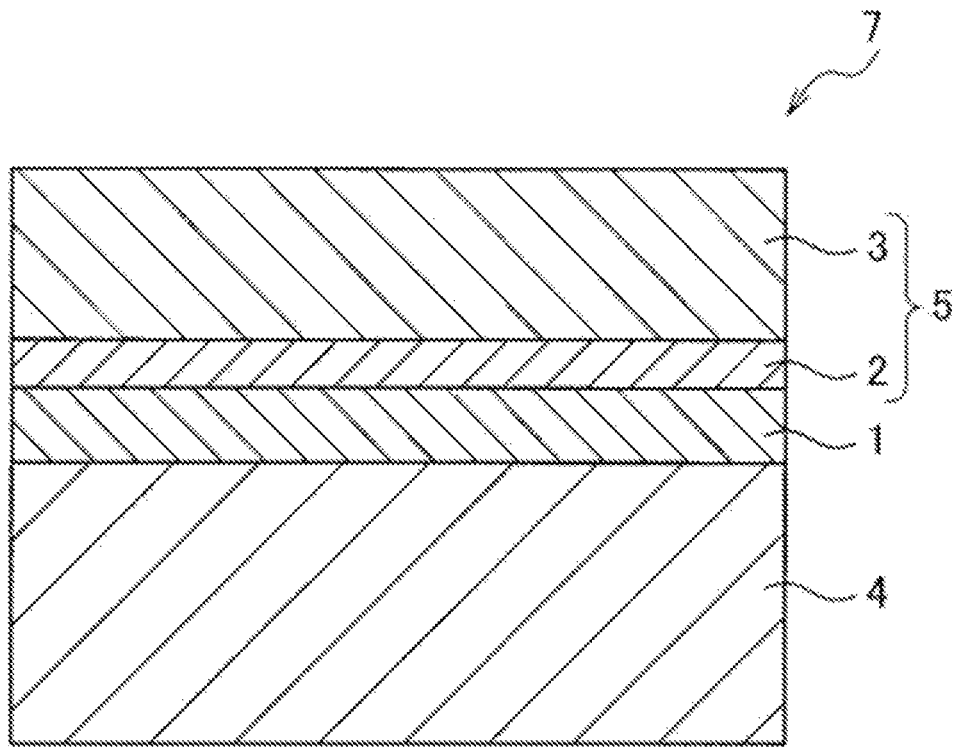
FIG. 1 is a schematic cross-sectional view illustrating an example of a layer configuration of an electrophotographic photoconductor according to a present exemplary embodiment.

Hereinafter, an exemplary embodiment as an example of the present invention will be described. These descriptions and Examples illustrate the exemplary embodiment, and do not limit the scope of the invention.

In the numerical ranges described in stages in the present description, an upper limit or a lower limit described in one numerical range may be replaced with an upper limit or a lower limit of the numerical range described in other stages. Further, in the numerical ranges described in the present description, the upper limit or the lower limit of the numerical range may be replaced with values shown in Examples.

Each component may contain plural kinds of corresponding substances.

In a case of referring to an amount of each component in a composition, when there are plural kinds of substances corresponding to each component in the composition, unless otherwise specified, it refers to a total amount of the plural kinds of substances present in the composition.

The term "step" indicates not only an independent step, and even when a step cannot be clearly distinguished from other steps, this step is included in the term "step" as long as the intended purpose of the step is achieved.

<Electrophotographic Photoconductor>

An electrophotographic photoconductor (hereinafter, the "electrophotographic photoconductor" is also simply referred to as a "photoconductor") according to a first exemplary embodiment includes a conductive substrate, and a photoconductive layer, and an outermost surface layer contains a binder resin, a charge transporting material, fluorine-containing resin particles, and an acidic compound.

The number of carboxyl groups in the fluorine-containing resin particles is 0 or more and 30 or less per $10^6$ carbon atoms of the fluorine-containing resin particles.

Further, in a case where charging and exposure of the electrophotographic photoconductor are repeated 10,000 times under conditions of a charging potential of −700 V and an exposure intensity of 5 mJ/m$^2$, an absolute value of a difference ($|RP_1-RP_{10000}|$) between a residual potential $RP_1$ after charging and exposure once and a residual potential $RP_{10000}$ after charging and exposure 10,000 times is 25 V or less.

With the above configuration, the photoconductor according to the first exemplary embodiment may prevent a decrease in the image density uniformity when image formation is continuously performed, then paused, and image formation is performed again. The reasons are presumed as follows.

For the purpose of improving wear resistance of the photoconductor, the outermost surface layer of the photoconductor may contain fluorine-containing resin particles. The fluorine-containing resin particles may affect electrical characteristics of the photoconductor. Then, in order to ensure chargeability which is one of the electrical characteristics of the photoconductor, as the fluorine-containing resin particles, fluorine-containing resin particles in which the number of carboxyl groups is 0 or more and 30 or less per 10$^6$ carbon atoms (hereinafter, also simply referred to as "specific fluorine-containing resin particles") may be used.

However, in a photoconductor containing the specific fluorine-containing resin particles in an outermost surface layer, the image density uniformity may decrease when image formation is continuously performed, then paused, and image formation is performed again. When image formation is continuously performed using an image forming apparatus including the photoconductor including the specific fluorine-containing resin particles in the outermost surface layer, a residual potential of the photoconductor may increase. Thereafter, the image forming apparatus is paused to reduce the residual potential. However, since various members such as a cleaning member and a charging roller are present around the photoconductor, an environment around the photoconductor is not uniform. A rate of decrease in the residual potential may be affected by the environment around the photoconductor, and the uniformity of a degree of decrease in the residual potential may decrease. Thus, when image formation is performed again, the image density uniformity is likely to decrease.

The photoconductor according to the first exemplary embodiment contains the acidic compound in the outermost surface layer of the photoconductor. The acidic compound has a high probability of being detrapped even if carriers (that is, holes or electrons) generated in the photoconductive layer are trapped. Therefore, in the photoconductor according to the first exemplary embodiment, the degree of decrease in the residual potential is nearly uniform.

Further, in the photoconductor according to the first exemplary embodiment, the absolute value ($|RP_1-RP_{10000}|$) is 25 V or less. This indicates that the residual potential of the photoconductor is less likely to increase. Therefore, by setting the absolute value ($|RP_1-RP_{10000}|$) within the range, a difference in the degree of decrease in the residual potential tends to be small when image formation is continuously performed and then paused.

From the above, it is presumed that, with the above configuration, the photoconductor according to the first exemplary embodiment may prevent a decrease in the image density uniformity when image formation is continuously performed, then paused, and image formation is performed again.

A photoconductor according to a second exemplary embodiment includes a conductive substrate, and a photoconductive layer, and an outermost surface layer contains a binder resin, a charge transporting material, fluorine-containing resin particles, and an acidic compound.

The number of carboxyl groups in the fluorine-containing resin particles is 0 or more and 30 or less per 10$^6$ carbon atoms of the fluorine-containing resin particles.

Further, a content of the charge transporting material in the outermost surface layer is 59 mass % or more and 72 mass % or less with respect to the binder resin.

With the above configuration, the photoconductor according to the second exemplary embodiment may prevent a decrease in the image density uniformity when image formation is continuously performed, then paused, and image formation is performed again. The reasons are presumed as follows.

Since the photoconductor according to the second exemplary embodiment contains the acidic compound in the outermost surface layer of the photoconductor, a degree of decrease in a residual potential is nearly uniform for the same reason as described above.

Further, in the photoconductor according to the second exemplary embodiment, the content of the charge transporting material, in the outermost surface layer, with respect to the binder resin (hereinafter, also simply referred to as a "TB ratio") is within the above numerical range. By setting the TB ratio within the range, carriers generated in the photoconductive layer are less likely to accumulate. Further, by setting the TB ratio within the range, a capture cross-sectional area is likely to be reduced. Therefore, the residual potential of the photoconductor is less likely to increase. Therefore, by setting the TB ratio within the range, a difference in the degree of decrease in the residual potential tends to be small when image formation is continuously performed and then paused.

From the above, it is presumed that, with the above configuration, the photoconductor according to the second exemplary embodiment may prevent a decrease in the image density uniformity when image formation is continuously performed, then paused, and image formation is performed again.

Hereinafter, a photoconductor corresponding to both the photoconductors according to the first and second exemplary embodiments (hereinafter, also referred to as "the photoconductor according to the present exemplary embodiment") will be described in detail. However, an example of the photoconductor of the present invention may be any photoconductor corresponding to one of the photoconductors according to the first and second exemplary embodiments.

Hereinafter, the electrophotographic photoconductor according to the present exemplary embodiment will be described with reference to the drawings.

Examples of an electrophotographic photoconductor 7 shown in FIG. 1 include a photoconductor 7 having a structure in which an undercoat layer 1, a charge generating layer 2, and a charge transporting layer 3 are laminated in this order on a conductive support 4. The charge generating layer 2 and the charge transporting layer 3 constitute a photoconductive layer 5.

The electrophotographic photoconductor 7 may have a layer configuration in which the undercoat layer 1 is not provided.

Further, the electrophotographic photoconductor 7 may be a photoconductor including a single-layer-type photoconductive layer in which functions of the charge generating layer 2 and the charge transporting layer 3 are integrated. In a case of the photoconductor including the single-layer-type photoconductive layer, the single-layer-type photoconductive layer constitutes an outermost surface layer.

Hereinafter, each layer of the electrophotographic photoconductor according to the present exemplary embodiment will be described in detail. In the following description, reference numerals will be omitted.

(Outermost Surface Layer)

The outermost surface layer includes a binder resin, a charge transporting material, fluorine-containing resin particles, and an acidic compound. The outermost surface layer may contain an additive depending on a layer to be applied (that is, a charge transporting layer of a laminated type photoconductive layer, or a single-layer-type photoconductive layer). Details of the layer to be applied will be described later.

Binder Resin

The binder resin is a binder resin contained in the charge transporting layer and the single-layer-type photoconductive layer. Details of the binder resin will be described later.

A content of the binder resin is preferably 52 mass % or more and 59 mass % or less, more preferably 53 mass % or more and 57 mass % or less, and still more preferably 54 mass % or more and 56 mass % or less with respect to a total solid content in the outermost surface layer.

—Charge Transporting Material—

Examples of the charge transporting material include an electron transporting compound such as a quinone-based compound such as p-benzoquinone, chloranil, bromanil, and anthraquinone; a tetracyano quinodimethane-based compound; a fluorenone compound such as 2,4,7-trinitrofluorenone; a xanthone-based compound; a benzophenone-based compound; a cyanovinyl-based compound; and an ethylene-based compound. Examples of the charge transporting material also include a hole transporting compound such as a triarylamine-based compound, a benzidine-based compound, an arylalkane-based compound, an aryl-substituted ethylene-based compound, a stilbene-based compound, an anthracene-based compound, and a hydrazone-based compound. These charge transporting materials may be used alone or in combination of two or more thereof, but are not limited thereto.

As the charge transporting material, from the viewpoint of charge mobility, a triarylamine derivative represented by the following structural formula (a-1) and a benzidine derivative represented by the following structural formula (a-2) are preferred.

(a-1)

In the structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of a substituent of each of the above groups include a halogen atom, an alkyl group having 1 or more and 5 or less carbon atoms, and an alkoxy group having 1 or more and 5 or less carbon atoms. Further, examples of the substituent of each of the above groups also include a substituted amino group substituted with an alkyl group having 1 or more and 3 or less carbon atoms.

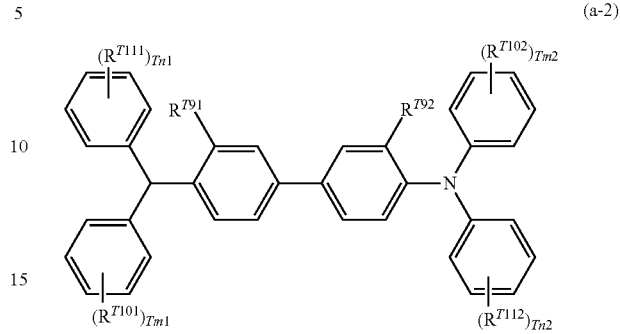

(a-2)

In the structural formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted with an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group Tm1, Tm2, Tn1, and Tn2 each independently represent an integer of 0 or more and 2 or less.

Examples of a substituent of each of the above groups include a halogen atom, an alkyl group having 1 or more and 5 or less carbon atoms, and an alkoxy group having 1 or more and 5 or less carbon atoms. Further, examples of the substituent of each of the above groups also include a substituted amino group substituted with an alkyl group having 1 or more and 3 or less carbon atoms.

Here, among the triarylamine derivative represented by the structural formula (a-1) and the benzidine derivative represented by the structural formula (a-2), a triarylamine derivative having "$-C_6H_4-CH=CH-CH=C(R^{T7})(R^{T8})$" and a benzidine derivative having "$-CH=CH-CH=C(R^{T15})(R^{T16})$" are particularly preferred, from the viewpoint of charge mobility.

As a polymer charge transporting material, a well-known material having charge transporting properties such as poly-N-vinylcarbazole or polysilane is used. In particular, a polyester-based polymer charge transporting material disclosed in JP-A-H08-176293, JP-A-H08-208820, etc. is particularly preferred. The polymer charge transporting material may be used alone or in combination with the binder resin.

—Fluorine-Containing Resin Particles—

The number of carboxyl groups in the fluorine-containing resin particles is 0 or more and 30 or less per $10^6$ carbon atoms of the fluorine-containing resin particles.

The number of the carboxyl groups in the fluorine-containing resin particles is preferably 0 or more and 20 or less per $10^6$ carbon atoms of the fluorine-containing resin particles, from the viewpoint of improving the chargeability.

Here, each carboxyl group of the fluorine-containing resin particles is, for example, a carboxyl group derived from a terminal carboxylic acid contained in the fluorine-containing resin particles.

An amount of the carboxyl groups in the fluorine-containing resin particles is measured as follows, as described in JP-A-H04-20507, etc.

The fluorine-containing resin particles are preliminarily molded by a press machine to produce a film having a thickness of about 0.1 mm. An infrared absorption spectrum of the produced film is measured. An infrared absorption spectrum of fluorine-containing resin particles obtained by bringing the fluorine-containing resin particles into contact with a fluorine gas, in which a carboxylic acid terminal is completely fluorinated, is also measured, and the number of terminal carboxyl groups (per $10^6$ carbon atoms) is calculated by the following equation from a difference spectrum between the two: the number of terminal carboxyl groups (per $10^6$ carbon atoms)=(l×K)/t; l: absorbance; K: correction coefficient; t: film thickness (mm); an absorbed wave number of the carboxyl groups is set to 3560 cm$^{-1}$ and a correction coefficient is set to 440.

Examples of the fluorine-containing resin particles include particles of a homopolymer of a fluoroolefin, and particles of a copolymer of two or more kinds, which is a copolymer of one or more kinds of fluoroolefins and a non-fluorine-based monomer (that is, a monomer having no fluorine atom).

Examples of the fluoroolefin include a perhaloolefin such as tetrafluoroethylene (TFE), perfluorovinyl ether, hexafluoropropylene (HFP), and chlorotrifluoroethylene (CTFE), and a non-perfluoroolefin such as vinylidene fluoride (VdF), trifluoroethylene, and vinyl fluoride. Among these, VdF, TFE, CTFE, HFP, and the like are preferred.

On the other hand, examples of the non-fluorine-based monomer include: a hydrocarbon-based olefin such as ethylene, propylene, and butene; an alkyl vinyl ether such as cyclohexyl vinyl ether (CHVE), ethyl vinyl ether (EVE), butyl vinyl ether, and methyl vinyl ether; an alkenyl vinyl ether such as polyoxyethylene allyl ether (POEAE) and ethyl allyl ether; an organosilicon compound having a reactive α, β-unsaturated group such as vinyltrimethoxysilane (VSi), vinyltriethoxysilane, and vinyltris (methoxyethoxy) silane; an acrylic acid ester such as methyl acrylate and ethyl acrylate; a methacrylate ester such as methyl methacrylate and ethyl methacrylate; and a vinyl ester such as vinyl acetate, vinyl benzoate, "VeoVA" (trade name, vinyl ester manufactured by Shell). Among these, an alkyl vinyl ether, an allyl vinyl ether, a vinyl ester, an organosilicon compound having a reactive α, β-unsaturated group are preferred.

Among these, as the fluorine-containing resin particles, particles having a high fluorination ratio are preferred, particles such as polytetrafluoroethylene (PTFE), tetrafluoroethylene-hexafluoropropylene copolymer (FEP), tetrafluoroethylene-perfluoro (alkyl vinyl ether) copolymer (PFA), ethylene-tetrafluoroethylene copolymer (ETFE), and ethylene-chlorotrifluoroethylene copolymer (ECTFE) are more preferred, and particles of PTFE, FEP, and PFA are particularly preferred.

The fluorine-containing resin particles are preferably particles in which the number of carboxyl groups is 0 or more and 30 or less per $10^6$ carbon atoms and an amount of a basic compound is 0 ppm or more and 3 ppm or less.

When the number of the carboxyl groups and the amount of the basic compound of the fluorine-containing resin particles are within the above ranges, an increase in the residual potential may be further prevented.

The amount of the basic compound of the fluorine-containing resin particles is preferably 0 ppm or more and 1.5 ppm or less, and more preferably 0 ppm or more and 1.2 ppm or less, from the viewpoint of preventing an increase in the residual potential. ppm is based on mass.

The basic compound of the fluorine-containing resin particles is, for example, 1) a basic compound derived from a polymerization initiator used when fluorine-containing resin particles are granulated together with polymerization, 2) a basic compound used in a step of aggregating after polymerization, and 3) a basic compound used as a dispersion aid that stabilizes a dispersion liquid after polymerization.

Examples of the basic compound include an amine compound, a hydroxide of an alkali metal or an alkaline earth metal, an oxide of an alkali metal or an alkaline earth metal, acetates, and the like (for example, in particular, an amine compound).

Examples of the basic compound include a basic compound having a boiling point, which is a boiling point under normal pressure (under 1 atm), of 40° C. or higher and 130° C. or lower (preferably 50° C. or higher and 110° C. or lower, more preferably 60° C. or higher and 90° C. or lower).

Examples of the amine compound include a primary compound, a secondary compound, and a tertiary amine compound.

Examples of a primary amine compound include methylamine, ethylamine, propylamine, isopropylamine, n-butylamine, isobutylamine, t-butylamine, hexylamine, 2-ethylhexylamine, secondary butylamine, allylamine, and methylhexylamine.

Examples of a secondary amine compound include dimethylamine, diethylamine, di-n-propylamine, diisopropylamine, di-n-butylamine, diisobutylamine, di-t-butylamine, dihexylamine, di(2-ethylhexyl) amine, N-isopropyl-N-isobutylamine, disecondary butylamine, diallylamine, N-methylhexylamine, 3-pipecoline, 4-pipecoline, 2,4-lupetidine, 2,6-lupetidine, 3,5-lupetidine, morpholine, and N-methylbenzylamine.

Examples of a tertiary amine compound include trimethylamine, triethylamine, tri-n-propylamine, triisopropylamine, tri-n-butylamine, triisobutylamine, tri-t-butylamine, trihexylamine, tri(2-ethylhexyl) amine, N-methylmorpholine, N,N-dimethylallylamine, N-methyldiallylamine, triallylamine, N,N,N',N'-tetramethyl-1,2-diaminoethane, N,N,N',N'-tetramethyl-1,3-diaminopropane, N,N,N',N'-tetraallyl-1,4-diaminobutane, N-methylpiperidine, pyridine, 4-ethylpyridine, N-propyldialkylamine, 3-dimethylaminopropanol, 2-ethylpyrazine, 2,3-dimethylpyrazine, 2,5-dimethylpyrazine, 2,4-lutidine, 2,5-lutidine, 3,4-lutidine, 3,5-lutidine, 2,4,6-cholidine, 2-methyl-4-ethylpyridine, 2-methyl-5-ethylpyridine, N,N,N',N'-tetramethylhexamethylenediamine, N-ethyl-3-hydroxypiperidine, 3-methyl-4-ethylpyridine, 3-ethyl-4-methylpyridine, 4-(5-nonyl)pyridine, imidazole, and N-methylpiperazine.

Examples of the hydroxide of the alkali metal or the alkaline earth metal include NaOH, KOH, Ca(OH)$_2$, Mg(OH)$_2$, and Ba(OH)$_2$.

Examples of the oxide of the alkali metal or the alkaline earth metal include CaO and MgO.

Examples of the acetates include zinc acetate and sodium acetate.

Examples of a method for reducing the amount of the basic compound of the fluorine-containing resin particles include 1) a method of washing the particles with water, an organic solvent (alcohol such as methanol, ethanol, and isopropanol, tetrahydrofuran, or the like) after production of the particles, and 2) a method of heating the particles (for example, heating the particles to 200° C. or higher and 250° C. or lower), and decomposing or vaporizing the basic compound to remove the basic compound after production of the particles.

The amount of the basic compound of the fluorine-containing resin particles is measured as follows.

—Pretreatment—

An outermost surface layer containing fluorine-containing resin particles is immersed in a solvent (for example, tetrahydrofuran), and the fluorine-containing resin particles and substances other than a substance insoluble in the solvent are dissolved in the solvent (for example, tetrahydrofuran), and then the resultant mixture is added dropwise to pure water to filter precipitates. A solution containing PFOA obtained at that time is collected. Further, an insoluble substance obtained by filtration is dissolved in a solvent and is added dropwise to pure water to filter precipitates. This operation is repeated five times in total. Then, the fluorine-containing resin particles (800 mg) is added into chloroform (1.5 mL), and the basic compound is eluted from the fluorine-containing resin particles to obtain a measurement sample.

When a composition containing the fluorine-containing resin particles is to be measured, the composition is subjected to the same treatment as in a case of a layered product to obtain a measurement sample.

When the fluorine-containing resin particles themselves are to be measured, the fluorine-containing resin particles are subjected to the same treatment as in a case of measurement from the outermost surface layer to obtain a measurement sample.

—Measurement—

On the other hand, by using a basic compound solution (specifically, methanol solvent) having a well-known concentration and using gas chromatography, a calibration curve (which is a calibration curve from 0 ppm to 100 ppm) is obtained from a basic compound concentration and a peak area value of the basic compound solution (specifically, methanol solvent) having the well-known concentration.

Then, the measurement sample is measured by the gas chromatography, and the amount of the basic compound of the measurement sample is calculated from the peak area and the calibration curve which are obtained. The amount of the basin compound in the fluorine-containing resin particles is calculated by dividing the calculated amount of the basic compound of the measurement sample by the amount of fluorine-containing resin particles. Measurement conditions are as follows.

—Measurement Condition—

Headspace Sampler: (HP7694, manufactured by HP)

Measurement device: gas chromatography (HP6890 series, manufactured by HP)

Detector: hydrogen flame ionization detector (FID)

Column: (HP190915-433, manufactured by HP)

Sample heating time: 10 min

Sprit Ratio: 300:1

Flow rate: 1.0 ml/min

Column temperature rising setting: 60° C. (3 min), 60° C./min, 200° C. (1 min)

An average particle diameter of the fluorine-containing resin particles is not particularly limited, and is preferably 0.2 μm or more and 4.5 μm or less, and more preferably 0.2 μm or more and 4 μm or less.

The average particle diameter of the fluorine-containing resin particles is a value measured by the following method.

A maximum diameter of the fluorine-containing resin particles (secondary particles in which primary particles are aggregated) is measured by observing with an SEM (Scanning Electron Microscope) at, for example, a magnification of 5000 times or more, and an average value obtained by performing this measurement for 50 particles is taken as the average particle diameter of the fluorine-containing resin particles. As the SEM, JSM-6700F manufactured by JEOL Ltd. is used to observe a secondary electron image at an accelerating voltage of 5 kV.

From the viewpoint of dispersion stability, a specific surface area (BET specific surface area) of the fluorine-containing resin particles is preferably 5 $m^2/g$ or more and 15 $m^2/g$ or less, and more preferably 7 $m^2/g$ or more and 13 $m^2/g$ or less. The specific surface area is a value measured by a nitrogen substitution method using a BET type specific surface area measuring apparatus (FlowSorb II 2300, manufactured by Shimadzu Corporation).

From the viewpoint of dispersion stability, an apparent density of the fluorine-containing resin particles is preferably 0.2 g/ml or more and 0.5 g/ml or less, and more preferably 0.3 g/ml or more and 0.45 g/ml or less.

The apparent density is a value measured in accordance with JIS K6891 (1995).

A melting temperature of the fluorine-containing resin particles is preferably 300° C. or higher and 340° C. or lower, and more preferably 325° C. or higher and 335° C. or lower.

The melting temperature is a melting point measured in accordance with JIS K6891 (1995).

A content of the fluorine-containing resin particles is preferably 3 mass % or more and 11 mass % or less, more preferably 5 mass % or more and 10 mass % or less, and still more preferably 7 mass % or more and 9 mass % or less with respect to the total solid content in the outermost surface layer.

The fluorine-containing resin particles include particles obtained by irradiation with radiation (in the present description, also referred to as "radiation-irradiated type fluorine-containing resin particles"), particles obtained by a polymerization method (in the present description, also referred to as "polymerization type fluorine-containing resin particles"), and the like.

The radiation-irradiated type fluorine-containing resin particles (that is, fluorine-containing resin particles obtained by irradiation with radiation) refer to fluorine-containing resin particles granulated together with radiation polymerization, and low quantified and atomized fluorine-containing resin particles due to decomposition of a fluorine-containing resin after polymerization by irradiation with radiation.

The radiation-irradiated type fluorine-containing resin particles also contain a large amount of carboxyl groups because a large amount of carboxylic acids are generated by irradiation with radiation in the air.

On the other hand, the polymerization type fluorine-containing resin particles (that is, fluorine-containing resin particles obtained by the polymerization method) refer to fluorine-containing resin particles granulated together with polymerization by a suspension polymerization method, an emulsion polymerization method, or the like, and are not irradiated with radiation.

Examples of a method for making the amount of the carboxyl groups in the fluorine-containing resin particles within the above range include 1) a method of not performing irradiation with radiation in a process of particle production, and 2) a method of performing irradiation with radiation under a condition where oxygen is not present or a condition where an oxygen concentration is reduced.

The fluorine-containing resin particles may be polymerization type fluorine-containing resin particles. As described above, the polymerization type fluorine-containing resin particles are the fluorine-containing resin particles granulated together with polymerization by a suspension polymerization method, an emulsion polymerization method, or the like, and are not irradiated with radiation.

Here, production of the fluorine-containing resin particles by the suspension polymerization method is, for example, a method in which additives such as a polymerization initiator and a catalyst are suspended in a dispersion medium together with a monomer for forming a fluorine-containing resin, and then a polymerization product is granulated while the monomer is polymerized.

Further, production of the fluorine-containing resin particles by the emulsion polymerization method is, for example, a method in which additives such as a polymerization initiator and a catalyst are emulsified with a surfactant (that is, an emulsifier) in a dispersion medium together with a monomer for forming a fluorine-containing resin, and then a polymerization product is granulated while the monomer is polymerized.

In particular, the fluorine-containing resin particles may be particles obtained without performing irradiation with radiation in a production step.

However, as the fluorine-containing resin particles, the radiation-irradiated type fluorine-containing resin particles in which radiation irradiation is performed under a condition where oxygen is not present or an oxygen concentration is reduced.

—Acidic Compound—

The acidic compound may be either an inorganic acid or an organic acid. The acidic compound may be used alone or in combination of two or more thereof.

Examples of the inorganic acid include a phosphoric acid compound (which is a compound having a $PO^{-3}$ group: for example, phosphoric acid ($N_3PO_4$)), a nitric acid compound (which is a compound having a $NO_3^-$ group: for example, nitric acid ($HNO_3$)), and hydrogen chloride (HCl).

Examples of the organic acid include a sulfonic acid compound and a carboxylic acid compound.

The sulfonic acid compound is a compound having a $SOH_3^-$ group. Examples of the sulfonic acid compound include a sulfonic acid compound, in which an alkyl group having 1 or more and 20 or less carbon atoms (preferably 1 or more and 12 or less carbon atoms) is substituted, which has a benzene ring (toluenesulfonic acid, benzenesulfonic acid, dodecylbenzenesulfonic acid, 2,4-dimethylbenzenesulfonic acid, hydroxybenzenesulfonic acid, etc.), an alkylsulfonic acid having 1 or more and 6 or less (preferably 1 or more and 4 or less) carbon atoms (methylsulfonic acid, ethylsulfonic acid, propanesulfonic acid, butanesulfonic acid, etc.), and a hydrate thereof.

The carboxylic acid compound is a compound having a —COOH group. Examples of the carboxylic acid compound include oxalic acid, N,N-dimethylanthranyl acid, maleic acid, pyromellitic acid, pyruvic acid, tartaric acid, citric acid, trifluoroacetic acid, and phthalic acid.

That is, as the acidic compound, from the viewpoint of reducing trap probability of carriers, preventing an increase in the residual potential, and making residual potential recovery unevenness less likely to occur during print pause, or further increasing detrap probability of carriers to make the degree of decrease in the residual potential of the photoconductor more nearly uniform, at least one selected from the group consisting of a sulfonic acid compound, a carboxylic acid compound, a phosphoric acid compound, and a nitric acid compound is preferred.

Among these, from the viewpoint of preventing a degree of increase in the residual potential of the photoconductor or further nearly uniform a degree of decrease in the residual potential by making it easy for an acid dissociation constant (pKa) to be described later to fall within a desired range and thereby reducing resistance of the outermost surface layer, as the acidic compound, at least one selected from the group consisting of a sulfonic acid compound and a carboxylic acid compound is more preferred, and at least one selected from the group consisting of a sulfonic acid compound having a benzene ring and a carboxylic acid compound having 2 or more and 4 or less carboxyl groups is still more preferred.

The acidic compound is preferably an acidic compound having an acid dissociation constant (pKa) of 3 or less in water at 25° C.

Here, the acid dissociation constant (pKa) means a first acid dissociation constant (pKa 1).

By setting the acid dissociation constant (pKa) of the acidic compound within the range, the resistance of the outermost surface layer may be likely to be reduced. As a result, the degree of increase in the residual potential of the photoconductor may be likely to be prevented, or the degree of decrease in the residual potential of the photoconductor may be more likely to be nearly uniform.

The acid dissociation constant (pKa) of the acidic compound is preferably −2.8 or more and 2.5 or less, more preferably −2.1 or more and 2.5 or less, still more preferably −2 or more and 2.5 or less, and most preferably 0.5 or more and 2 or less, from the viewpoint of reducing the resistance of the outermost surface layer.

A content of the acidic compound is preferably 25 ppm or more and 1000 ppm or less, more preferably 30 ppm or more and 700 ppm or less, and still more preferably 40 ppm or more and 500 ppm or less, with respect to the outermost surface layer.

By setting the content of the acidic compound within the above range, the trap probability of the carriers may be reduced, the increase in the residual potential may be prevented, and the residual potential recovery unevenness may be less likely to occur during the print pause, or the detrap probability of the carriers may be more likely to increase, and the degree of decrease in the residual potential of the photoconductor may be more likely to be nearly uniform.

—Fluorine-Based Graft Polymer—

The outermost surface layer may contain a fluorine-based graft polymer as necessary.

The fluorine-based graft polymer is a dispersant having a fluorine element.

Examples of the fluorine-based graft polymer include a polymer obtained by homopolymerization or copolymerization of a polymerizable compound having a fluorinated alkyl group (hereinafter also referred to as a "fluorinated alkyl group-containing polymer").

Specific examples of the fluorine-based graft polymer include a homopolymer of a (meth)acrylate having a fluorinated alkyl group, and a random or block copolymer of a (meth)acrylate having a fluorinated alkyl group and a monomer having no fluorine atom. The (meth)acrylate means both acrylate and methacrylate.

Examples of the (meth)acrylate having the fluorinated alkyl group include 2,2,2-trifluoroethyl (meth)acrylate and 2,2,3,3,3-pentafluoropropyl (meth)acrylate.

Examples of the monomer having no fluorine atom include (meth)acrylate, isobutyl (meth)acrylate, t-butyl (meth)acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxytriethylene glycol (meth)acrylate, 2-ethoxyethyl (meth)acrylate, tetrahydroflufuryl (meth)acrylate, benzyl (meth)acrylate, ethylcarbitol (meth)acrylate, phenoxyethyl (meth)acrylate, 2-hydroxy (meth)acrylate, 2-hydroxypropyl (meth)acrylate, 4-hydroxybutyl (meth)acrylate, methoxy polyethylene glycol (meth)acrylate, phenoxy polyethylene glycol (meth)acrylate, hydroxyethyl o-phenylphenol (meth) acrylate, and o-phenylphenol glycidyl ether (meth)acrylate.

In addition, specific examples of the fluorine-based graft polymer also include a block or branch polymer disclosed in the specification of U.S. Pat. No. 5,637,142, Japanese Patent No. 4251662, etc. Further, specific examples of the fluorine-based graft polymer also include a fluorine-based surfactant.

Among these, as the fluorine-based graft polymer, a fluorinated alkyl group-containing polymer having a structural unit represented by the following general formula (FA) is preferred, and a fluorinated alkyl group-containing polymer having a structural unit represented by the following general formula (FA) and a structural unit represented by the following general formula (FB) is more preferred.

Hereinafter, the fluorinated alkyl group-containing polymer having the structural unit represented by the following general formula (FA) and the structural unit represented by the following general formula (FB) will be described.

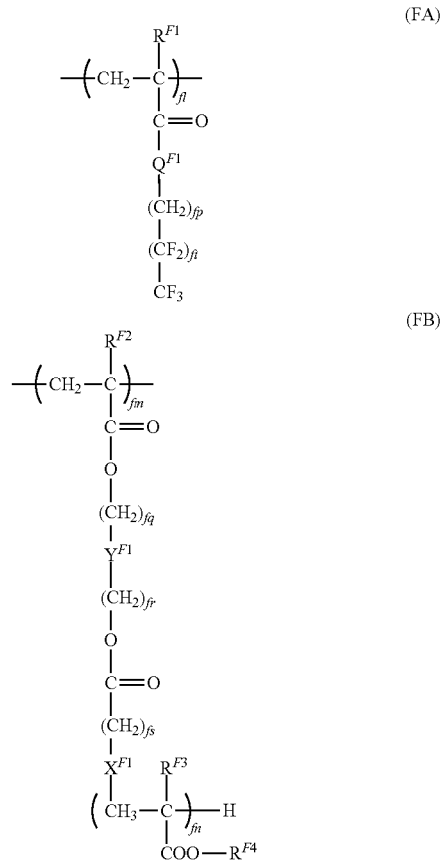

In the general formulas (FA) and (FB), $R^{F1}$, $R^{F2}$, $R^{F3}$, and $R^{F4}$ each independently represent a hydrogen atom or an alkyl group.

$X^{F1}$ represents an alkylene chain, a halogen-substituted alkylene chain, —S—, —O—, —NH—, or a single bond.

$Y^{F1}$ represents an alkylene chain, a halogen-substituted alkylene chain, —$(C_{fx}H_{2fx-1}(OH))$— or a single bond.

$QF1$ represents —O— or —NH—.

fl, fm, and fn each independently represent an integer of 1 or more.

fp, fq, fr, and fs each independently represent 0 or an integer of 1 or more.

ft represents an integer of 1 or more and 7 or less.

fx represents an integer of 1 or more.

In the general formulas (FA) and (FB), as the group representing $R^{F1}$, $R^{F2}$, $R^{F3}$, and $R^{F4}$, a hydrogen atom, a methyl group, an ethyl group, a propyl group, and the like are preferred, a hydrogen atom and a methyl group are more preferred, and a methyl group is still more preferred.

In the general formulas (FA) and (FB), as the alkylene chain (unsubstituted alkylene chain or halogen-substituted alkylene chain) representing $X^{F1}$ and $Y^{F1}$, a linear or branched alkylene chain having 1 or more and 10 or less carbon atoms is preferred.

fx in —$(C_{fx}H_{2fx-1}(OH))$— representing $Y^{F1}$ preferably represents an integer of 1 or more and 10 or less.

fp, fq, fr, and fs preferably each independently represent 0 or an integer of 1 or more and 10 or less.

fn is, for example, preferably 1 or more and 60 or less.

Here, in the fluorine-based graft polymer, a ratio of the structural unit represented by the general formula (FA) to the structural unit represented by the general formula (FB), that is, fl:fm, is preferably in a range of 1:9 to 9:1, and more preferably in a range of 3:7 to 7:3.

The fluorine-based graft polymer may further include a structural unit represented by a general formula (FC) in addition to the structural unit represented by the general formula (FA) and the structural unit represented by the general formula (FB). A content ratio of the structural unit represented by the general formula (FC) is a ratio (fl+fm:fz) of a sum of the structural units represented by the general formulas (FA) and (FB), that is, fl+fm, to the structural unit represented by the general formula (FC) and is preferably in a range of 10:0 to 7:3, and more preferably in a range of 9:1 to 7:3.

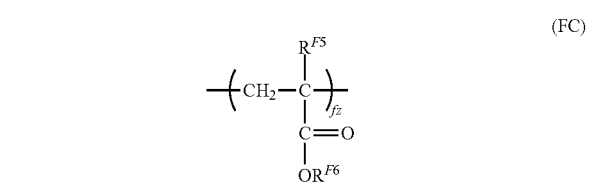

In the general formula (FC), $R^{F5}$ and $R^{F6}$ each independently represent a hydrogen atom or an alkyl group. fz represents an integer of 1 or more.

In the general formula (FC), as the group representing $R^{F5}$ and $R^{F6}$, a hydrogen atom, a methyl group, an ethyl group, a propyl group, and the like are preferred, a hydrogen atom and a methyl group are more preferred, and a methyl group is still more preferred.

Examples of a commercially available product of the fluorine-based graft polymer include GF300 and GF400 (manufactured by Toagosei Co., Ltd.), Surflon series (manufactured by AGC Seimi Chemical Co., Ltd.), Ftergent series (manufactured by Neos Corporation), PF series (manufactured by Kitamura Chemicals Co., Ltd.), Megafac series (manufactured by DIC Corporation), FC series (manufactured by 3M Company), and the like.

A weight average molecular weight Mw of the fluorine-based graft polymer is preferably 20,000 or more and 200,000 or less, and more preferably 50,000 or more and 200,000 or less, from the viewpoint of improving dispersibility of the fluorine-containing resin particles.

The weight average molecular weight of the fluorine-based graft polymer is a value measured by gel permeation chromatography (GPC). A molecular weight measurement by GPC is performed, for example, in a chloroform solvent by using a GPC·HLC-8120 manufactured by Tosoh Corporation as a measurement device and using a column TSKgel GMHHR-M+TSKgel GMHHR-M (7.8 mm I.D. 30 cm) manufactured by Tosoh Corporation, and from measurement results, a molecular weight is calculated by using a molecular weight calibration curve prepared using a monodispersion polystyrene standard sample.

A content of the fluorine-based graft polymer is, for example, preferably 0.5 mass % or more and 10 mass % or less, and more preferably 1 mass % or more and 7 mass % or less with respect to the fluorine-containing resin particles.

The fluorine-based graft polymer may be used alone or in combination of two or more thereof.

—TB Ratio—

The content of the charge transporting material in the outermost surface layer with respect to the binder resin (that is, the TB ratio) is 59 mass % or more and 72 mass % or less.

From the viewpoint of further preventing an increase in the residual potential of the photoconductor, the TB ratio is preferably 60 mass % or more and 71 mass % or less, more preferably 61 mass % or more and 69 mass % or less, and still more preferably 64 mass % or more and 67 mass % or less.

(Conductive Substrate)

Examples of the conductive substrate include a metal plate, a metal drum, and a metal belt containing a metal (aluminum, copper, zinc, chromium, nickel, molybdenum, vanadium, indium, gold, platinum, etc.) or an alloy (stainless steel, etc.). Further, examples of the conductive substrate also include paper, a resin film, and a belt coated, deposited, or laminated with a conductive compound (a conductive polymer, indium oxide, etc.), a metal (aluminum, palladium, gold, etc.), or an alloy. Here, the expression "conductive" means that a volume resistivity is less than $10^{13}$ Ω·cm.

When the electrophotographic photoconductor is used in a laser printer, a surface of the conductive substrate is preferably roughened to a center line average roughness Ra of 0.04 or more and 0.5 μm or less for the purpose of preventing interference fringes generated when irradiating with a laser beam. When a non-interfering light is used as a light source, the roughening for preventing the interference fringes is not particularly necessary, but the roughening prevents occurrence of defects due to unevenness of the surface of the conductive substrate, and thus may be suitable for extending a lifetime.

Examples of a roughening method include wet honing performed by suspending an abrasive in water and spraying the obtained suspension onto a conductive substrate, centerless grinding in which a conductive substrate is pressed against a rotating grinding stone to perform continuous grinding, and an anodizing treatment.

Examples of the roughening method also include a method of roughening by dispersing a conductive or semiconductive powder in a resin, then forming a layer on a surface of a conductive substrate, and dispersing particles in the layer, without roughening the surface of the conductive substrate.

In a roughening treatment by anodizing, by anodizing, in an electrolyte solution, a conductive substrate made of a metal (for example, made of aluminum) as an anode, an oxide film is formed on the surface of the conductive substrate. Examples of the electrolyte solution include a sulfuric acid solution and an oxalic acid solution. However, a porous anodic oxide film formed by anodizing is chemically active in a state as it is, is easily contaminated, and has a large resistance variation depending on an environment. Therefore, it is preferable to perform, on the porous anodic oxide film, a pore-sealing treatment in which fine pores of the oxide film are sealed by volume expansion due to a hydration reaction in pressurized water vapor or boiling water (a salt of a metal such as nickel may be added), and the oxide film is changed to a more stable hydrated oxide.

A film thickness of the anodic oxide film is preferably 0.3 μm or more and 15 μm or less, for example. When the film thickness is within the above range, a barrier property against injection may tend to be exhibited, and an increase in residual potentials due to repeated use may tend to be prevented.

The conductive substrate may be subjected to a treatment with an acidic treatment solution or a boehmite treatment.

The treatment with the acidic treatment solution is performed, for example, as follows. Firstly, an acidic treatment solution containing phosphoric acid, chromic acid, and hydrofluoric acid is prepared. A blending ratio of the phosphoric acid, the chromic acid, and the hydrofluoric acid in the acidic treatment solution may be: for example, the phosphoric acid in a range of 10 mass % or more and 11 mass % or less, the chromic acid in a range of 3 mass % or more and 5 mass % or less, and the hydrofluoric acid in a range of 0.5 mass % or more and 2 mass % or less, and a concentration of all the acids as a whole may be in a range of 13.5 mass % or more and 18 mass % or less. A treatment temperature is preferably 42° C. or higher and 48° C. or lower, for example. A film thickness of a coating film is preferably 0.3 μm or more and 15 μm or less.

The boehmite treatment is performed, for example, by immersing the conductive substrate in pure water at 90° C. or higher and 100° C. or lower for 5 minutes to 60 minutes, or bringing the conductive substrate into contact with heated water vapor at 90° C. or higher and 120° C. or lower for 5 minutes to 60 minutes. A film thickness of a coating film is preferably 0.1 μm or more and 5 μm or less. The conductive substrate may be further anodized with an electrolyte solution having a low solubility of a coating film, such as an adipic acid, a boric acid, a borate, a phosphate, a phthalate, a maleate, a benzoate, a tartrate, or a citrate.

(Undercoat Layer)

The undercoat layer is, for example, a layer containing inorganic particles and a binder resin.

Examples of the inorganic particles include inorganic particles having a powder resistance (volume resistivity) of $10^2$ Ω·cm or more and $10^{11}$ Ω·cm or less.

Among these, the inorganic particles having the above resistance value may be, for example, metal oxide particles such as tin oxide particles, titanium oxide particles, zinc oxide particles, and zirconium oxide particles, and particularly preferably zinc oxide particles.

A specific surface area of the inorganic particles measured by a BET method may be, for example, 10 m$^2$/g or more.

A volume average particle diameter of the inorganic particles may be, for example, 50 nm or more and 2000 nm or less (preferably 60 nm or more and 1000 nm or less).

A content of the inorganic particles is, for example, preferably 10 mass % or more and 80 mass %, and more preferably 40 mass % or more and 80 mass % or less, with respect to the binder resin.

The inorganic particles may be subjected to a surface treatment. As the inorganic particles, two or more kinds of i- norganic particles, which are subjected to surface treatments different from each other or have particle diameters different from each other, may be mixed and used.

Examples of a surface treatment agent include a silane coupling agent, a titanate-based coupling agent, an aluminum-based coupling agent, and a surfactant. In particular, a silane coupling agent is preferred, and a silane coupling agent having an amino group is more preferred.

Examples of the silane coupling agent having the amino group include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

The silane coupling agent may be used in a mixture of two or more thereof. For example, the silane coupling agent having the amino group and another silane coupling agent may be used in combination. Examples of other silane coupling agents include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

A surface treatment method using the surface treatment agent may be any well-known method, and may be either a dry method or a wet method.

A treatment amount of the surface treatment agent is, for example, preferably 0.5 mass % or more and 10 mass % or less with respect to the inorganic particles.

Here, the undercoat layer may contain an electron accepting compound (acceptor compound) together with the inorganic particles, from the viewpoint of increasing long-term stability of electrical characteristics and carrier blocking properties.

Examples of the electron accepting compound include an electron transporting substance such as a quinone-based compound such as chloranil and bromoanil; a tetracyano quinodimethane-based compound; a fluorenone compound such as 2,4,7-trinitrofluorenone and 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; a xanthone-based compound; a thiophene compound; and a diphenoquinone compound such as 3,3',5,5'-tetra-t-butyldiphenoquinone.

In particular, as the electron accepting compound, a compound having an anthraquinone structure is preferred. As the compound having the anthraquinone structure, for example, a hydroxyanthraquinone compound, an aminoanthraquinone compound, an aminohydroxyanthraquinone compound, and the like are preferred, and specifically, for example, anthraquinone, alizarin, quinizarin, anthrarufin, purpurin, and the like are preferred.

The electron accepting compound may be contained in the undercoat layer in a state of being dispersed together with the inorganic particles, or may be contained in a state of being attached to a surface of the inorganic particles.

As a method of attaching the electron accepting compound to the surface of the inorganic particles, a dry method or a wet method may be exemplified.

The dry method is, for example, a method in which an electron accepting compound is added dropwise directly or in a state of being dissolved in an organic solvent, and is sprayed together with dry air or nitrogen gas while stirring inorganic particles with a mixer or the like having a large shearing force to attach the electron accepting compound to a surface of the inorganic particles. When the electron accepting compound is added dropwise or sprayed, the dropwise addition or spraying may be performed at a temperature equal to or lower than a boiling point of a solvent. After the electron accepting compound is added dropwise or sprayed, baking may be further performed at a temperature of 100° C. or higher. The baking is not particularly limited as long as the baking is set to a temperature and a time at which electrophotographic characteristics may be obtained.

The wet method is, for example, a method in which an electron accepting compound is added while inorganic particles are dispersed in a solvent by stirring, ultrasonic waves, a sand mill, an attritor, a ball mill, or the like, the resultant mixture is stirred or dispersed, and then the solvent is removed to attach the electron accepting compound to a surface of the inorganic particles. With regard to a solvent removing method, the solvent is distilled, for example, by filtration or distillation. After the solvent is removed, baking may be further performed at a temperature of 100° C. or higher. The baking is not particularly limited as long as the baking is set to a temperature and a time at which electrophotographic characteristics may be obtained. In the wet method, moisture contained in the inorganic particles may be removed before the electron accepting compound is added, and examples thereof include a method of removing moisture while performing stirring and heating in a solvent, and a method of removing moisture by azeotroping with a solvent.

The attachment of the electron accepting compound may be performed before or after performing the surface treatment on the inorganic particles with the surface treatment agent, or the attachment of the electron accepting compound and the surface treatment with the surface treatment agent may be performed simultaneously.

A content of the electron accepting compound may be, for example, 0.01 mass % or more and 20 mass % or less, and preferably 0.01 mass % or more and 10 mass % or less, with respect to the inorganic particles.

Examples of the binder resin used in the undercoat layer include a well-known material such as a well-known polymer compound such as an acetal resin (for example, polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin; a zirconium chelate compound; a titanium chelate compound; an aluminum chelate compound; a titanium alkoxide compound; an organic titanium compound; and a silane coupling agent.

Examples of the binder resin used in the undercoat layer also include a charge transporting resin having a charge transporting group, and a conductive resin (for example, polyaniline).

Among these, as the binder resin used in the undercoat layer, a resin that is insoluble in a coating solvent of an upper layer is suitable, and particularly, a thermosetting resin such as a urea resin, a phenol resin, a phenol-formaldehyde resin, a melamine resin, a urethane resin, an unsaturated polyester resin, an alkyd resin, and an epoxy resin; and a resin obtained by a reaction between a curing agent and at least one resin selected from the group consisting of a polyamide resin, a polyester resin, a polyether resin, a methacrylic resin, an acrylic resin, a polyvinyl alcohol resin, and a polyvinyl acetal resin are suitable.

When two or more of these binder resins are used in combination, a mixing ratio is set as necessary.

The undercoat layer may contain various additives for electrical characteristic improvement, environmental stability improvement, and image quality improvement Examples of the additive include a well-known material such as an electron transporting pigment of a polycyclic condensation type, an azo type, or the like, a zirconium chelate compound, a titanium chelate compound, an aluminum chelate compound, a titanium alkoxide compound, an organic titanium compound, and a silane coupling agent. The silane coupling agent is used for the surface treatment of the inorganic particles as described above, but may be further added to the undercoat layer as an additive.

Examples of the silane coupling agent as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compound include tetraisopropyl titanate, tetranormal butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxytitanium stearate.

Examples of the aluminum chelate compound include aluminum isopropylate, monobutoxyaluminum diisopropionate, aluminum butyrate, diethyl acetoacetate aluminum diisopropionate, and aluminum tris(ethylacetoacetate).

These additives may be used alone or as a mixture or polycondensate of plural compounds.

The undercoat layer may have a Vickers hardness of 35 or more.

In order to prevent a moire image, a surface roughness (10-point average roughness) of the undercoat layer may be adjusted to from $1/(4n)$ (n is a refractive index of an upper layer) to ½ of an exposure laser wavelength $\lambda$ to be used.

Resin particles or the like may be added to the undercoat layer in order to adjust the surface roughness. Examples of the resin particles include silicone resin particles and crosslinked polymethyl methacrylate resin particles. Further, a surface of the undercoat layer may be polished in order to adjust the surface roughness. Examples of a polishing method include buff polishing, sand blasting, wet honing, and grinding.

Formation of the undercoat layer is not particularly limited and a well-known formation method is used, and for example, the formation is performed as follows: a coating film of an undercoat layer-forming coating liquid obtained by adding the above components to a solvent is formed, and the coating film is dried, and is heated as necessary.

Examples of the solvent for preparing the undercoat layer-forming coating liquid include a well-known organic solvent such as an alcohol-based solvent, an aromatic hydrocarbon solvent, a halogenated hydrocarbon solvent, a ketone-based solvent, a ketone-alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of a method for dispersing the inorganic particles when preparing the undercoat layer-forming coating liquid include a well-known method such as a roll mill, a ball mill, a vibration ball mill, an attritor, a sand mill, a colloid mill, and a paint shaker.

Examples of a method for coating the undercoat layer-forming coating liquid onto the conductive substrate include a typical method such as a blade coating method, a wire bar coating method, a spray coating method, a dip coating method, a bead coating method, an air knife coating method, and a curtain coating method.

A film thickness of the undercoat layer is set to, for example, preferably 15 μm or more and 55 μm or less, and more preferably in a range of 20 μm or more and 50 μm or less.

(Intermediate Layer)

Although not shown, an intermediate layer may be further formed between the undercoat layer and the photoconductive layer.

The intermediate layer is, for example, a layer containing a resin. Examples of the resin used in the intermediate layer include a polymer compound such as an acetal resin (for example, polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, and a melamine resin.

The intermediate layer may be a layer containing an organic metal compound. Examples of the organic metal compound used in the intermediate layer include an organic metal compound containing a metal atom such as zirconium, titanium, aluminum, manganese, and silicon.

These compounds used in the intermediate layer may be used alone or as a mixture or polycondensate of plural compounds.

Among these, the intermediate layer is preferably a layer containing an organic metal compound containing a zirconium atom or a silicon atom.

Formation of the intermediate layer is not particularly limited and a well-known formation method is used, and for example, the formation is performed as follows: a coating film of an intermediate layer-forming coating liquid obtained by adding the above components to a solvent is formed, and the coating film is dried, and is heated as necessary.

As a coating method for forming the intermediate layer, a typical method such as a dip coating method, a push-up coating method, a wire bar coating method, a spray coating method, a blade coating method, a knife coating method, and a curtain coating method is used.

A film thickness of the intermediate layer is preferably set in a range of, for example, 0.1 μm or more and 3 μm or less. The intermediate layer may be used as the undercoat layer.

(Charge Generating Layer)

The charge generating layer is, for example, a layer containing a charge generating material and a binder resin. Further, the charge generating layer may be a vapor-deposited layer of the charge generating material. The vapor-deposited layer of the charge generating material is suitable when a non-interfering light source such as a LED (Light Emitting Diode) and an organic EL (Electro-Luminescence) image array is used.

Examples of the charge generating material include an azo pigment such as bisazo and trisazo, a condensed-ring aromatic pigment such as dibromoanthanthrone, a perylene pigment, a pyrrolopyrrole pigment, a phthalocyanine pigment, zinc oxide, and trigonal selenium.

Among these, in order to cope with laser exposure in a near-infrared region, it is preferable to use a metal phthalocyanine pigment or a metal-free phthalocyanine pigment as the charge generating material. Specifically, the charge generating material is, for example, more preferably hydroxygallium phthalocyanine disclosed in JP-A-H05-263007, JP-A-H05-279591, etc., chlorogallium phthalocyanine disclosed in JP-A-H05-98181, etc., dichlorotin phthalocyanine disclosed in JP-A-H05-140472, JP-A-H05-140473, etc., and titanyl phthalocyanine disclosed in JP-A-H04-189873, etc.

Meanwhile, in order to cope with laser exposure in a near-ultraviolet region, the charge generating material is preferably a condensed-ring aromatic pigment such as dibromoanthanthrone, a thioindigo pigment, a porphyrazine compound, zinc oxide, trigonal selenium, and a bisazo pigment disclosed in JP-A-2004-78147 and JP-A-2005-181992.

Even when a non-interfering light source such as a LED and an organic EL image array having a light-emission center wavelength of 450 nm or more and 780 nm or less is used, the above charge generating material may be used, but from the viewpoint of resolution, when the photoconductive layer is used in a thin film of 20 μm or less, electric field intensity in the photoconductive layer is high, and an image defect called so-called black spots, that is, a decrease in charging due to charge injection from a substrate may be likely to occur. This is remarkable when a charge generating material such as trigonal selenium and phthalocyanine pigment which are p-type semiconductors and are likely to generate a dark current is used.

In contrast, when an n-type semiconductor such as a condensed-ring aromatic pigment, a perylene pigment, or an azo pigment is used as the charge generating material, a dark current may be less likely to occur, and even in a thin film, an image defect called black spots may be prevented. Examples of the n-type charge generating material include, but are not limited to, compounds (CG-1) to (CG-27) described in paragraphs [0288] to [0291] in JP-A-2012-155282.

Determination of the n-type is made by a polarity of a flowing photocurrent by using a time-of-flight method that is typically used, and a case where electrons are more likely to be caused to flow as carriers in comparison to holes is set as the n-type.

The binder resin used in the charge generating layer may be selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and an aromatic divalent carboxylic acid, or the like), a polycarbonate resin, a polyester resin, a phenoxy resin, a vinyl chloride-vinyl acetate copolymer, a polyamide resin, an acrylic resin, a polyacrylamide resin, a polyvinyl pyridine resin, a cellulose resin, a urethane resin, an epoxy resin, casein, a polyvinyl alcohol resin, and a polyvinyl pyrrolidone resin. Here, the term "insulating" means that a volume resistivity is $10^{13}$ Ω·cm or more.

These binder resins may be used alone or in combination of two or more thereof.

A mixing ratio of the charge generating material to the binder resin is preferably in a range of 10:1 to 1:10 in terms of mass ratio.

The charge generating layer may contain other well-known additives.

Formation of the charge generating layer is not particularly limited and a well-known formation method is used, and for example, the formation is performed as follows: a coating film of a charge generating layer-forming coating liquid obtained by adding the above components to a solvent is formed, and the coating film is dried, and is heated as necessary. The formation of the charge generating layer may be performed by vapor deposition of the charge generating material. The formation of the charge generating layer by vapor deposition is particularly suitable when a condensed-ring aromatic pigment or a perylene pigment is used as the charge generating material.

Examples of the solvent for preparing the charge generating layer-forming coating liquid include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in combination of two or more thereof.

As a method for dispersing particles (for example, the charge generating material) in the charge generating layer-forming coating liquid, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type in which a dispersion liquid is dispersed by liquid-liquid collision or liquid-wall collision in a high-pressure state, and a penetration type in which a dispersion liquid is dispersed by penetrating a fine flow path in a high-pressure state.

At the time of the dispersion, it is effective to set an average particle diameter of the charge generating material in the charge generating layer-forming coating liquid to 0.5 μm or less, preferably 0.3 μm or less, and more preferably 0.15 μm or less.

Examples of a method for coating the charge generating layer-forming coating liquid onto the undercoat layer (or the intermediate layer) include a typical method such as a blade coating method, a wire bar coating method, a spray coating method, a dip coating method, a bead coating method, an air knife coating method, and a curtain coating method.

A film thickness of the charge generating layer is preferably set in a range of, for example, 0.1 μm or more and 5.0 μm or less, and more preferably 0.2 μm or more and 2.0 μm or less.

(Charge Transporting Layer)

The charge transporting layer is, for example, a layer containing a charge transporting material and a binder resin.

The charge transporting layer may be a layer containing a polymer charge transporting material.

Examples of the charge transporting material include an electron transporting compound such as a quinone-based compound such as p-benzoquinone, chloranil, bromanil, and anthraquinone; a tetracyano quinodimethane-based compound; a fluorenone compound such as 2,4,7-trinitrofluorenone; a xanthone-based compound; a benzophenone-based compound; a cyanovinyl-based compound; and an ethylene-based compound. Examples of the charge transporting material also include a hole transporting compound such as a triarylamine-based compound, a benzidine-based compound, an arylalkane-based compound, an aryl-substituted ethylene-based compound, a stilbene-based compound, an anthracene-based compound, and a hydrazone-based compound. These charge transporting materials may be used alone or in combination of two or more thereof, but are not limited thereto.

As the charge transporting material, from the viewpoint of charge mobility, a triarylamine derivative represented by the following structural formula (a-1) and a benzidine derivative represented by the following structural formula (a-2) are preferred.

(a-1)

In the structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of a substituent of each of the above groups include a halogen atom, an alkyl group having 1 or more and 5 or less carbon atoms, and an alkoxy group having 1 or more and 5 or less carbon atoms. Further, examples of the substituent of each of the above groups also include a substituted amino group substituted with an alkyl group having 1 or more and 3 or less carbon atoms.

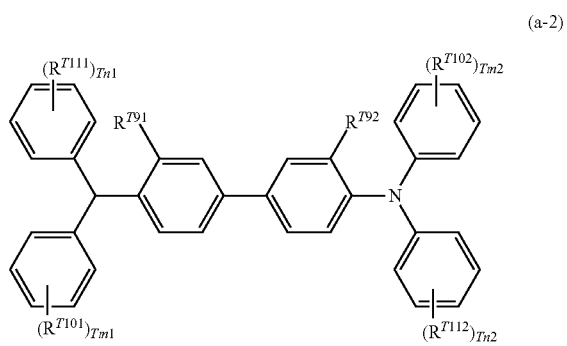

(a-2)

In the structural formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted with an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of a substituent of each of the above groups include a halogen atom, an alkyl group having 1 or more and 5 or less carbon atoms, and an alkoxy group having 1 or more and 5 or less carbon atoms. Further, examples of the substituent of each of the above groups also include a substituted amino group substituted with an alkyl group having 1 or more and 3 or less carbon atoms.

Here, among the triarylamine derivative represented by the structural formula (a-1) and the benzidine derivative represented by the structural formula (a-2), a triarylamine derivative having "$-C_6H_4-CH=CH-CH=C(R^{T7})(R^{T8})$" and a benzidine derivative having "$-CH=CH-CH=C(R^{T15})(R^{T16})$" are particularly preferred, from the viewpoint of charge mobility.

As a polymer charge transporting material, a well-known material having charge transporting properties such as poly-N-vinylcarbazole or polysilane is used. In particular, a polyester-based polymer charge transporting material disclosed in JP-A-H08-176293, JP-A-H08-208820, etc. is particularly preferred. The polymer charge transporting material may be used alone or in combination with the binder resin.

Examples of the binder resin used in the charge transporting layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, as the binder resin, a polycarbonate resin or a polyarylate resin is preferred. These binder resins are used alone or in combination of two or more thereof.

A mixing ratio of the charge transporting material to the binder resin is preferably 10:1 to 1:5 in terms of mass ratio.

The charge transporting layer may contain other well-known additives.

Formation of the charge transporting layer is not particularly limited and a well-known formation method is used, and for example, the formation is performed as follows: a coating film of a charge transporting layer-forming coating liquid obtained by adding the above components to a solvent is formed, and the coating film is dried, and is heated as necessary.

As a drying condition of the coating film, it is preferable to heat for 15 minutes or more and 60 minutes or less under a condition of 100° C. or higher and 150° C. or lower.

In a photoconductor on which the charge transporting layer is formed by setting the drying condition of the coating film within the above range, a decrease in the image density uniformity when image formation is continuously performed, then paused, and image formation is performed again may be further prevented. The reasons are presumed as follows.

By setting the drying condition of the coating film within the above range, an amount of a residual solvent in the charge transporting layer may be likely to be reduced, and a thermal decomposition of the charge transporting material may be likely to be prevented. By reducing the residual solvent of the charge transporting layer or preventing the thermal decomposition of the charge transporting material, a hole transporting property may be likely to exhibit an original performance, and thus the residual potential of the photoconductor may be further less likely to increase.

From the above, it is presumed that a decrease in the image density uniformity when image formation is continuously performed, then paused, and image formation is performed again may be further prevented.

Examples of the solvent for preparing the charge transporting layer-forming coating liquid include a typical organic solvent such as aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in combination of two or more thereof.

Examples of a coating method when coating the charge transporting layer-forming coating liquid onto the charge generating layer include a typical method such as a blade coating method, a wire bar coating method, a spray coating method, a dip coating method, a bead coating method, an air knife coating method, and a curtain coating method.

A film thickness of the charge transporting layer is preferably set in a range of, for example, 5 μm or more and 50 μm or less, and more preferably 10 μm or more and 30 μm or less.

(Single-Layer-Type Photoconductive Layer)

The single-layer-type photoconductive layer (charge generating and charge transporting layer) is, for example, a layer containing a charge generating material, a charge transporting material, and, if necessary, a binder resin and other well-known additives. These materials are the same as the materials described in the charge generating layer and the charge transporting layer.

In the single-layer-type photoconductive layer, a content of the charge generating material may be 0.1 mass % or more and 10 mass % or less, and preferably 0.8 mass % or more and 5 mass % or less with respect to a total solid content. Further, in the single-layer-type photoconductive layer, a content of the charge transporting material may be 5 mass % or more and 50 mass % or less with respect to the total solid content.

A method for forming the single-layer-type photoconductive layer is the same as the method for forming the charge generating layer or the charge transporting layer.

A film thickness of the single-layer-type photoconductive layer may be, for example, 5 μm or more and 50 μm or less, and preferably 10 μm or more and 40 μm or less.

(Absolute Value of Residual Potential Difference $|RP_1-RP_{10000}|$)

In the photoconductor according to the present exemplary embodiment, when charging and exposure are repeated 10,000 times according to the following procedure, an absolute value ($|RP_1-RP_{10000}|$) of a difference between a residual potential $RP_1$ after charging and exposure once and a residual potential $RP_{10000}$ after charging and exposure 10,000 times is 25 V or less.

In measurement of the residual potentials $RP_1$ and $RP_{10000}$, charging and exposure of the photoconductor are performed according to the following procedure.

The photoconductor is charged in an environment of 30° C. and 85% RH by a scorotron charger having a grid application voltage of −700 V such that a potential of a surface of the photoconductor (that is, the charging potential) is −700 V. Next, after 0.1 seconds from the charging, the photoconductor is subjected to flash exposure with a light intensity of 5 mJ/m$^2$ using a semiconductor laser having a wavelength of 780 nm. A potential (V) of the surface of the photoconductor after 0.05 seconds from the exposure is measured, and the measured value is denoted as a residual potential $RP_1$. The operations of the charging and the exposure of the photoconductor are repeated in the same procedure (at this time, a potential (V) of the surface of the photoconductor is not measured), and then a potential (V) of the surface of the photoconductor is measured after 0.1 seconds from the exposure when the operations of the charging and the exposure are performed 10,000 times, and the measured value is denoted as a residual potential $RP_{10000}$.

From the viewpoint of further reducing a difference in the degree of decrease in the residual potential when image formation is continuously performed and then paused, the absolute value ($|RP_1-RP_{10000}|$) is preferably 25 V or less, more preferably 20 V or less, and still more preferably 10 V or less.

From the viewpoint of further reducing a difference in the degree of decrease in the residual potential when image formation is continuously performed and then paused, the absolute value ($|RP_1-RP_{10000}|$) is preferably 0 V, but may be 1 V or more, or may be 3 V or more.

Here, as a method for setting the absolute value ($|RP_1-RP_{10000}|$) within the above numerical range, for example, it is preferable that the outermost surface layer contains an acidic compound and the TB ratio is 54% or more and 75% or less.

From the viewpoint of preventing a decrease in the image density uniformity when image formation is continuously performed, then paused, and image formation is performed again, an absolute value ($|RP_{10000}|$) of the residual potential $RP_{10000}$ is preferably 100 V or less, more preferably 70 V or less, and still more preferably 40 V or less.

From the viewpoint of preventing a decrease in the image density uniformity when image formation is continuously performed, then paused, and image formation is performed again, the absolute value ($|RP_{10000}|$) of the residual potential $RP_{10000}$ is preferably 0 V, but may be 3V or more.

<Image Forming Apparatus (and Process Cartridge)>

The image forming apparatus according to the present exemplary embodiment includes: an electrophotographic photoconductor; a charging unit configured to charge a surface of the electrophotographic photoconductor; an electrostatic latent image forming unit configured to form an electrostatic latent image on the charged surface of the electrophotographic photoconductor; a developing unit configured to develop, by using a developer containing a toner, the electrostatic latent image formed on the surface of the electrophotographic photoconductor so as to form a toner image; and a transfer unit configured to transfer the toner image onto a surface of a recording medium. As the electrophotographic photoconductor, the above electrophotographic photoconductor according to the present exemplary embodiment is used.

The image forming apparatus according to the present exemplary embodiment is applied to a well-known image forming apparatus such as: an apparatus including a fixing unit that fixes a toner image transferred to a surface of a recording medium; a direct transfer type apparatus that directly transfers a toner image formed on a surface of an electrophotographic photoconductor onto a recording medium; an intermediate transfer type apparatus that primarily transfers a toner image formed on a surface of an electrophotographic photoconductor onto a surface of an intermediate transfer body and secondarily transfers the toner image transferred to the surface of the intermediate transfer body onto a surface of a recording medium; an apparatus including a cleaning unit that cleans a surface of an electrophotographic photoconductor after transfer of a toner image and before charging; an apparatus including a discharging unit that irradiates a surface of an electrophotographic photoconductor with a discharging light for discharging after transfer of a toner image and before charging; and an apparatus including an electrophotographic photoconductor heating member for increasing a temperature of an electrophotographic photoconductor and reducing a relative humidity.

In the case of an intermediate transfer type apparatus, the transfer unit includes, for example, an intermediate transfer body on which a toner image is transferred to a surface, a primary transfer unit that primarily transfers the toner image formed on a surface of an electrophotographic photoconductor onto the surface of the intermediate transfer body, and a secondary transfer unit that secondarily transfers the toner image transferred on the surface of the intermediate transfer body onto a surface of a recording medium.

The image forming apparatus according to the present exemplary embodiment may be either a dry developing type image forming apparatus or a wet developing type (in other words, a development type using a liquid developer) image forming apparatus.

In the image forming apparatus according to the present exemplary embodiment, for example, a portion including the electrophotographic photoconductor may be a cartridge structure (process cartridge) that is attached to and detached from the image forming apparatus. As the process cartridge, for example, a process cartridge including the electrophotographic photoconductor according to the present exemplary embodiment is suitably used. In addition to the electrophotographic photoconductor, the process cartridge may include, for example, at least one selected from the group consisting of a charging unit, an electrostatic latent image forming unit, a developing unit, and a transfer unit.

Here, the image forming apparatus is preferably an apparatus including a discharging unit that irradiates a surface of an electrophotographic photoconductor with a discharging light for discharging after transfer of a toner image and before charging.

In the image forming apparatus having such a configuration, since an amount of light irradiation received by the electrophotographic photoconductor during image formation is large, an amount of increase in the residual potential when image formation is continuously performed is large. For this reason, a decrease in the image density uniformity when image formation is continuously performed, then paused, and image formation is performed again may be likely to occur. Therefore, by applying photoconductor according to the present exemplary embodiment, an increase in the residual potential of the photoconductor may be prevented, and thus even in an image forming apparatus having the above configuration, a decrease in the image density uniformity when image formation is continuously performed, then paused, and image formation is performed again may be prevented.

Hereinafter, an example of the image forming apparatus according to the present exemplary embodiment will be described, but the image forming apparatus is not limited thereto. Main parts shown in the drawings will be described, and descriptions of other parts will be omitted.

Figure 2:
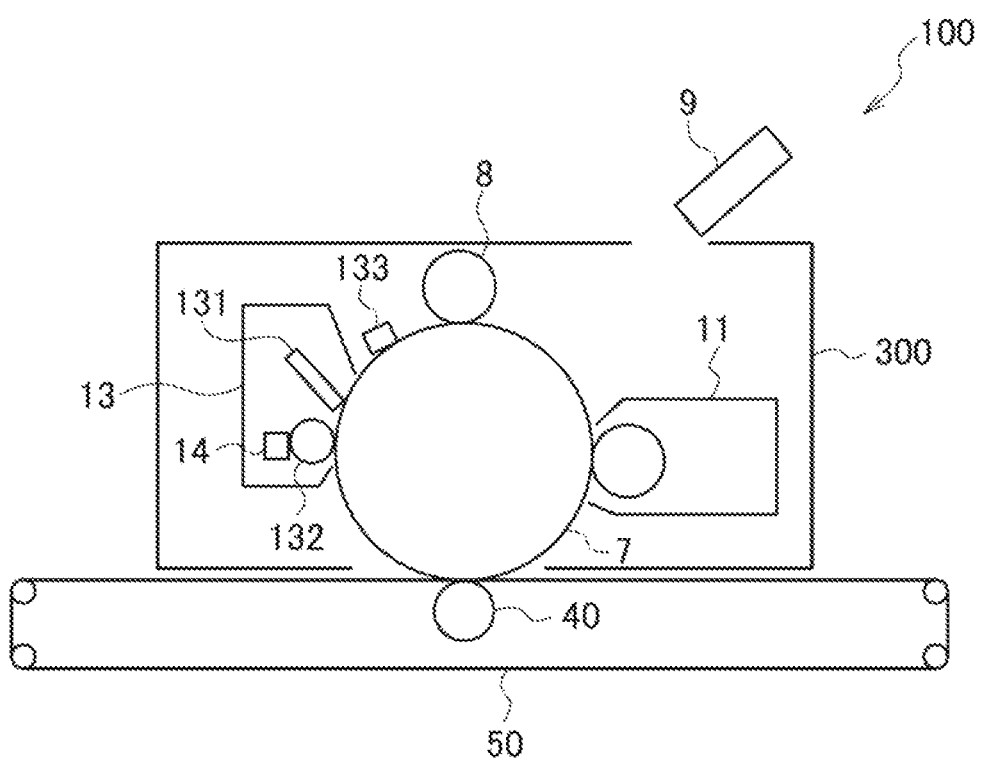
FIG. 2 is a schematic configuration diagram illustrating an example of an image forming apparatus according to the present exemplary embodiment.

FIG. 2 is a schematic configuration diagram illustrating an example of the image forming apparatus according to the present exemplary embodiment.

As shown in FIG. 2, an image forming apparatus 100 according to the present exemplary embodiment includes a process cartridge 300 including an electrophotographic photoconductor 7, an exposure device 9 (an example of the electrostatic latent image forming unit), a transfer device 40 (primary transfer device), and an intermediate transfer body 50. In the image forming apparatus 100, the exposure device 9 is disposed at a position where the electrophotographic photoconductor 7 may be exposed from an opening of the process cartridge 300, the transfer device 40 is disposed at a position facing the electrophotographic photoconductor 7 via the intermediate transfer body 50, and a part of the intermediate transfer body 50 is disposed in contact with the electrophotographic photoconductor 7. Although not shown, a secondary transfer device that transfers a toner image transferred to the intermediate transfer body 50 to a recording medium (for example, paper) is also included. The intermediate transfer body 50, the transfer device 40 (primary transfer device), and the secondary transfer device (not shown) correspond to an example of the transfer unit.

The process cartridge 300 shown in FIG. 2 integrally supports, in a housing, the electrophotographic photoconductor 7, a charging device 8 (an example of the charging unit), a developing device 11 (an example of the developing unit), and a cleaning device 13 (an example of a cleaning unit). The cleaning device 13 includes a cleaning blade 131 (an example of a cleaning member), and the cleaning blade 131 is disposed to be in contact with a surface of the electrophotographic photoconductor 7. The cleaning member may be a conductive or insulating fibrous member instead of the form of the cleaning blade 131, and the fibrous member may be used alone or in combination with the cleaning blade 131.

FIG. 2 shows an example in which the image forming apparatus includes a fibrous member 132 (which has a roll shape) that supplies a lubricant 14 to the surface of the electrophotographic photoconductor 7, and a fibrous member 133 (which has a flat brush shape) that assists the cleaning, but these members are disposed as necessary.

Hereinafter, each configuration of the image forming apparatus according to the present exemplary embodiment will be described.

—Charging Device—

As the charging device 8, for example, a contact type charger using a conductive or semiconductive charging roller, a charging brush, a charging film, a charging rubber blade, or a charging tube is used. Further, a charger, which is well known per se, such as a non-contact type roller charger, and a scorotron charger or a corotron charger using corona discharge, is also used.

—Exposure Device—

Examples of the exposure device 9 include an optical device that exposes the surface of the electrophotographic photoconductor 7 with a light such as a semiconductor laser light, an LED light, or a liquid crystal shutter light in a predetermined image pattern. A wavelength of the light source is within a spectral sensitivity range of the electrophotographic photoconductor. A mainstream wavelength of a semiconductor laser is near infrared, which has an oscillation wavelength in the vicinity of 780 nm. However, the present invention is not limited to this wavelength, and a laser having an oscillation wavelength of about 600 nm or a blue laser having an oscillation wavelength of 400 nm or more and 450 nm or less also may be used. Further, in order to form a color image, a surface emitting type laser light source capable of outputting a multiple beam is also effective.

—Developing Device—

Examples of the developing device 11 include a general developing device in which a developer is used in a contact or non-contact manner to perform developing. The developing device 11 is not particularly limited as long as the above function is provided, and is selected according to a purpose. Examples thereof include a well-known developing device provided with a function of attaching a one-component developer or a two-component developer to the electrophotographic photoconductor 7 using a brush, a roller, or the like. Among these, one using a developing roller in which a developer is held on a surface is preferred.

The developer used in the developing device 11 may be a one-component developer using only a toner or a two-component developer containing a toner and a carrier. Further, the developer may be magnetic or non-magnetic. As these developers, well-known developers are used.

—Cleaning Device—

As the cleaning device 13, a cleaning blade type device including the cleaning blade 131 is used.

In addition to the cleaning blade type, a fur brush cleaning type or a simultaneous development cleaning type may be adopted.

—Transfer Device—

Examples of the transfer device 40 include a transfer charger, which is well known per se, such as a contact type transfer charger using a belt, a roller, a film, a rubber blade, or the like, and a scorotron transfer charger or a corotron transfer charger using corona discharge.

—Intermediate Transfer Body—

As the intermediate transfer body 50, a belt-shaped member (intermediate transfer belt) containing semi-conductive polyimide, polyamideimide, polycarbonate, polyarylate, polyester, rubber, and the like is used. Further, as a form of the intermediate transfer body, a drum-shaped member may be used in addition to the belt-shaped member.

Figure 3:
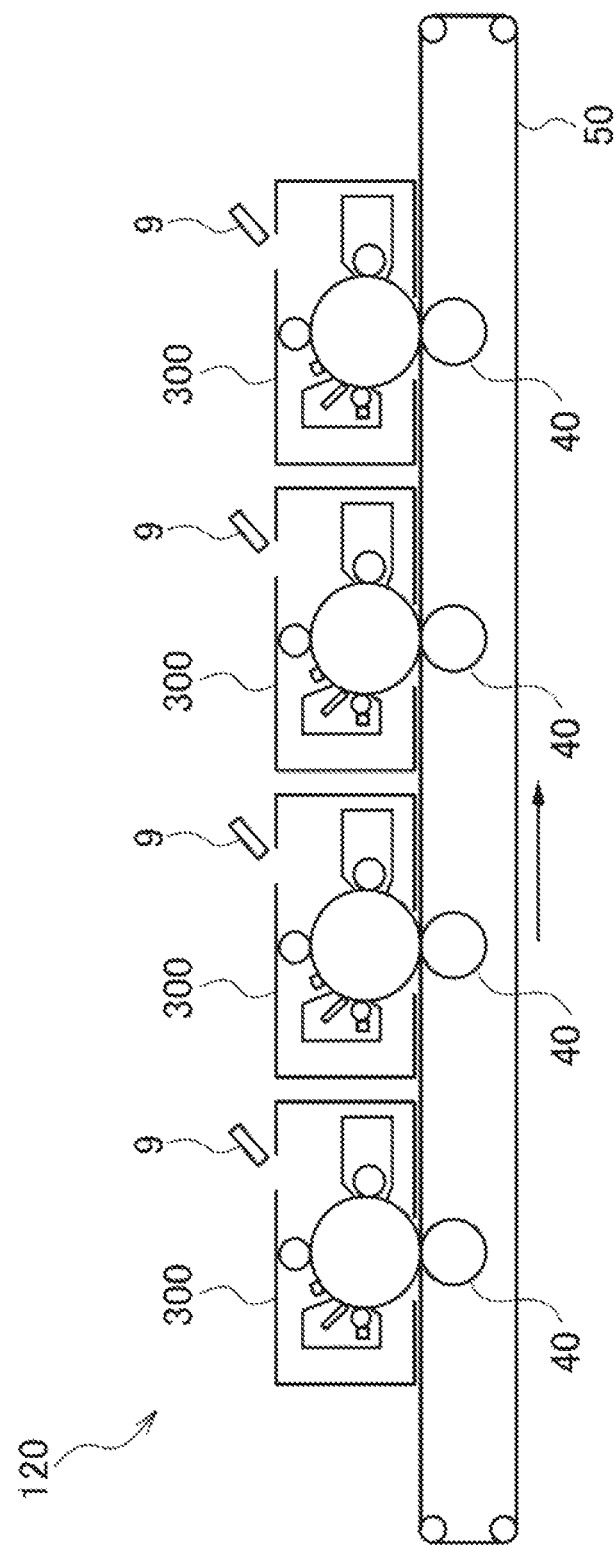
FIG. 3 is a schematic configuration diagram illustrating another example of the image forming apparatus according to the present exemplary embodiment.

FIG. 3 is a schematic configuration diagram illustrating another example of the image forming apparatus according to the present exemplary embodiment.

An image forming apparatus 120 shown in FIG. 3 is a tandem type multicolor image forming apparatus in which four process cartridges 300 are mounted. In the image forming apparatus 120, four process cartridges 300 are arranged in parallel on the intermediate transfer body 50, and one electrophotographic photoconductor is used for one color. The image forming apparatus 120 has the same configuration as that of the image forming apparatus 100 except that the image forming apparatus 120 is of a tandem type.

EXAMPLE

Hereinafter, Examples will be described, but the present invention is not limited to these Examples at all. In the following description, all "parts" and "%" are based on mass unless otherwise specified.

<Production of Fluorine-Containing Resin Particles>

—Production of Fluorine-Containing Resin Particles (1)—

The fluorine-containing resin particles (1) are produced as follows.

100 parts by mass of commercially available homopolytetrafluoroethylene fine powder (standard specific gravity 2.175 measured in accordance with ASTM D 4895 (2004)), and 2.4 parts by mass of ethanol as an additive are collected in a bag made of barrier nylon, and the entire bag is replaced with nitrogen. Then, irradiation is performed with 150 kGy of cobalt-60 γ-ray at room temperature to obtain a low molecular weight polytetrafluoroethylene powder. The obtained powder is pulverized to obtain the fluorine-containing resin particles (1).

—Production of Fluorine-Containing Resin Particles (2)—

The fluorine-containing resin particles (2) are produced in the same manner as in the production of the fluorine-containing resin particles (1) except that the entire bag is replaced with nitrogen such that an oxygen concentration is 8% in the production of the fluorine-containing resin particles (1).

—Production of Fluorine-Containing Resin Particles (3)—

3 liters of deionized water, 3.0 g of ammonium perfluorooctanoate, and 110 g of paraffin wax (manufactured by Nippon Oil Corporation) as an emulsion stabilizer are added to an autoclave, and oxygen is removed by replacing an inside of a system with nitrogen 3 times and with TFE (tetrafluoroethylene) 2 times, thereafter, an internal pressure is set to 1.0 MPa with the TFE, and an internal temperature is maintained at 70° C. while stirring at 250 rpm. Then, as a chain transfer agent, 20 ml of an aqueous solution in which 150 cc of ethane and 300 mg of ammonium persulfate as a polymerization initiator are dissolved at atmospheric pressure is added into the system to initiate a reaction. During the reaction, the temperature in the system is maintained at 70° C., and the TFE is continuously supplied such that the internal pressure of the autoclave is always maintained at 1.0±0.05 MPa. When an amount of the TFE consumed in the reaction reaches 1000 g after the addition of the initiator, the supply of the TFE and the stirring are stopped, and the reaction is terminated. Thereafter, particles are separated by centrifugation, 400 parts by mass of methanol is further collected, and the particles are washed with an agitator at 250 rpm for 10 minutes while performing irradiation with ultrasonic waves, and a supernatant is filtered. After repeating this operation 3 times, a filtrate is dried under reduced pressure at 60° C. for 17 hours.

Through the above steps, the fluorine-containing resin particles (3) are produced.

—Production of Fluorine-Containing Resin Particles (C1)—

The fluorine-containing resin particles (C1) are produced in the same manner as in the production of the fluorine-containing resin particles (1) except that irradiation with radiation is performed in the air in the production of the fluorine-containing resin particles (1).

Example 1

—Production of Photoconductor—

A photoconductor is produced by using the obtained fluorine-containing resin particles as follows.

100 parts of zinc oxide (average particle diameter: 70 nm, manufactured by Tayca Corporation, specific surface area value: 15 m²/g) and 500 parts of tetrahydrofuran are stirred and mixed, and 1.4 parts of a silane coupling agent (KBE 503, manufactured by Shin-Etsu Chemical Co., Ltd.) is added, and stirring is performed for 2 hours. Then, toluene is distilled under reduced pressure and baking is performed at 120° C. for 3 hours to obtain zinc oxide subjected to a surface treatment with a silane coupling agent.

le;.3q110 parts of the zinc oxide subjected to the surface treatment and 500 parts of tetrahydrofurane are stirred and mixed, a solution obtained by dissolving 0.6 parts of alizarin in 50 parts of tetrahydrofurane is added, and stirring is performed at 50° C. for 5 hours. Thereafter, the zinc oxide to which the alizarin is applied is filtered under reduced pressure, and further dried under reduced pressure at 60° C. to obtain alizarin-applied zinc oxide.

60 parts of the alizarin-applied zinc oxide, 13.5 parts of a curing agent (blocked isocyanate Sumidur 3175, manufactured by Sumitomo Bayer Urethane Co., Ltd.), 15 parts of a butyral resin (S-LEC BM-1, manufactured by Sekisui Chemical Co., Ltd.), and 85 parts of methyl ethyl ketone are mixed to obtain a mixed liquid. 38 parts of the mixed liquid and 25 parts of methyl ethyl ketone are mixed and dispersed with a sand mill for 2 hours using 1 mmφ glass beads to obtain a dispersion liquid.

0.005 parts of dioctyl tin dilaurate as a catalyst, and 30 parts of silicone resin particles (Tospearl 145, manufactured by Momentive Performance Materials Japan Inc.) are added to the obtained dispersion liquid, so as to obtain an undercoat layer coating liquid. The coating liquid is coated onto a cylindrical aluminum substrate by a dip coating method, and is dried and cured at 170° C. for 30 minutes to obtain an undercoat layer having a thickness of 24 μm.

Next, 1 part of hydroxygallium phthalocyanine in which a Bragg angle (2θ±0.2°) in an X-ray diffraction spectrum has a strong diffraction peak at 7.5°, 9.9°, 12.5°, 16.3°, 18.6°, 25.1°, and 28.3° is mixed with 1 part of polyvinyl butyral (S-LEC BM-5, manufactured by Sekisui Chemical Co., Ltd.) and 80 parts of n-butyl acetate, and the resultant mixture is subjected to a dispersion treatment together with glass beads in a paint shaker for 1 hour so as to prepare a charge generating layer coating liquid. The obtained coating liquid is dip-coated onto the conductive support on which the undercoat layer is formed, and is heated and dried at 130° C. for 10 minutes to form a charge generating layer having a film thickness of 0.15 μm.

39 parts of a benzidine compound represented by the following formula (CTM1) (TB ratio: 43%) as a charge transporting material, 52 parts of a polymer compound (viscosity average molecular weight: 40,000) having a repeating unit represented by the following formula (PCZ1) as a binder resin, and malonic acid as an acidic compound in an amount shown in Table 1 (hereinafter, the acidic compound is blended in an amount shown in Table 1 (amount (ppm) with respect to the solid content of the outermost surface layer)) are dissolved in 350 parts of toluene and 150 parts of tetrahydrofuran, and 9.8 parts of the fluorine-containing resin particles (1) and 1 part of a fluorine-containing dispersant GF400 (manufactured by Toagosei Co., Ltd.) are added, and the resultant mixture is treated 5 times with a high-pressure homogenizer to prepare a charge generating layer coating liquid.

The obtained coating liquid is coated onto the above charge generating layer by a dip coating method, and is heated at 140° C. for 45 minutes to form a charge transporting layer having a film thickness of 31 μm.

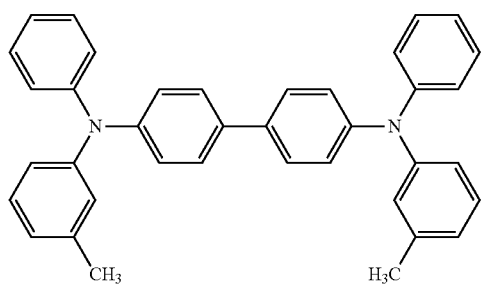

(CTM1)

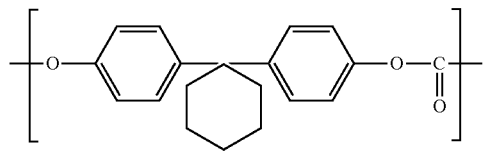

(PCZ1)

Through the above steps, each photoconductor is produced.

Examples 2 to 43, Comparative Examples 1 to 9, and Reference Examples 1 and 2

Photoconductors are produced in the same manner as in Example 1 except that a kind and an amount of the acidic compound, a kind of the fluorine-containing resin particles, a drying temperature at the time of forming the charge transporting layer, and addition amounts of the binder resin and the charge transporting material are changed to reach the TB ratios shown in Tables 1 to 3. A total addition amount of the binder resin and the charge transporting material is the same as in Example 1.

<Evaluation>

(Various Measurement)

The following characteristic of the fluorine-containing resin particles is measured according to the method described above.

"Number of carboxyl group (denoted as "COOH" in Tables 1 to 3) per $10^6$ carbon atoms"

The following characteristic of the photoconductor obtained in each Example is measured according to the method described above.

Absolute value ($|RP_1-RP_{10000}|$) (denoted as "ΔRP" in Tables 1 to 3)

—Measurement of Charging Potential—

A photoconductor is charged in an environment of 30° C. and 85% RH by a scorotron charger having a grid application voltage of −700 V. Then, after 0.1 seconds from the charging, a potential (V) of a surface of the photoconductor is measured, and the measured value is denoted as a charging potential $VH_1$. Thereafter, the photoconductor is subjected to flash exposure with a light intensity of 5 mJ/m² using a semiconductor laser having a wavelength of 780 nm to perform discharging of the photoconductor. The operations of the charging and the exposure of the photoconductor are repeated in the same procedure (at this time, a potential (V) of the surface of the photoconductor is not measured), and then a potential (V) of the surface of the photoconductor is measured after 0.1 seconds from the 10,000th charging, and the measured value is denoted as a charging potential $VH_{10000}$. Then, an absolute value ($|VH1-V_{10000}|$) of a difference between $VH_1$ and $VH_{10000}$ (denoted as "ΔVH" in Tables 1 to 3) is calculated.

—Image Density Unevenness Evaluation—

The obtained photoconductor is mounted on a copying machine "Versant 180i Press" manufactured by Fuji Xerox Co., Ltd., and 10,000 images having an image density of 30% are continuously output under conditions of 30° C. and 85% RH. Then, the copying machine is paused for 12 hours. Thereafter, one image having an image density of 30% is output again, and a density change of the image is visually observed. Evaluation criteria are as follows. Allowable ranges are A to C.

A: No change in density
B: Almost no change in density
C: A slight change in density is found, and a problem may occur in practical use
D: A change in density is found, and practical use is not durable.

TABLE 1

| | Fluorine-containing resin particles | | Acidic compound | | | TB ratio (%) | Drying temperature during charge transporting layer formation ° C. | Measurement result | | Image density unevenness |
|---|---|---|---|---|---|---|---|---|---|---|
| | Type | Number of COOH | Type | Amount (ppm) | pKa | | | ΔRP | ΔVH | |
| Example 1 | (1) | 15 | malonic acid | 50 | 2.65 | 75% | 140 | 21 V | 8 V | B |
| Example 2 | (1) | 15 | malonic acid | 50 | 2.65 | 72% | 140 | 17 V | 12 V | A |
| Example 3 | (1) | 15 | malonic acid | 50 | 2.65 | 59% | 140 | 25 V | 2 V | B |
| Example 4 | (1) | 15 | malonic acid | 50 | 2.65 | 69% | 140 | 21 V | 8 V | B |
| Example 5 | (1) | 15 | malonic acid | 50 | 2.65 | 61% | 140 | 24 V | 3 V | B |
| Example 6 | (1) | 15 | malonic acid | 50 | 2.65 | 70% | 140 | 20 V | 10 V | B |
| Example 7 | (1) | 15 | malonic acid | 50 | 2.65 | 60% | 140 | 22 V | 3 V | B |
| Example 8 | (1) | 15 | DBSA | 50 | −2.0 | 75% | 140 | 15 V | 16 V | A |
| Example 9 | (1) | 15 | phosphoric acid | 50 | 2.12 | 75% | 140 | 18 V | 10 V | A |
| Example 10 | (1) | 15 | nitric acid | 50 | −1.4 | 75% | 140 | 19 V | 14 V | B |
| Example 11 | (1) | 15 | hydrogen chloride | 50 | −8.0 | 75% | 140 | 25 V | 21 V | B |
| Example 12 | (2) | 30 | malonic acid | 50 | 2.65 | 75% | 140 | 9 V | 16 V | A |
| Example 13 | (3) | 7 | malonic acid | 50 | 2.65 | 75% | 140 | 25 V | 2 V | B |
| Reference Example 1 | (C1) | 75 | none | 0 | — | 75% | 140 | 3 V | 37 V | A |
| Reference Example 2 | (1) | 15 | none | 0 | — | 75% | 140 | 29 V | 5 V | C |
| Comparative Example 1 | (1) | 15 | none | 0 | — | 65% | 140 | 37 V | 3 V | D |
| Comparative Example 2 | (1) | 15 | none | 0 | — | 78% | 140 | 29 V | 5 V | C |
| Comparative Example 3 | (1) | 15 | malonic acid | 50 | 2.65 | 80% | 140 | 34 V | 49 V | C |
| Comparative Example 4 | (1) | 15 | malonic acid | 50 | 2.65 | 50% | 140 | 32 V | 1 V | C |

TABLE 2

| | Fluorine-containing resin particles | | Acidic compound | | | TB ratio (%) | Drying temperature during charge transporting layer formation ° C. | Measurement result | | Image density unevenness |
|---|---|---|---|---|---|---|---|---|---|---|
| | Type | Number of COOH | Type | Amount (ppm) | pKa | | | ΔRP | ΔVH | |
| Comparative Example 5 | (1) | 15 | none | 0 | — | 75% | 140 | 29 V | 5 V | C |
| Example 14 | (1) | 15 | malonic acid | 50 | 2.65 | 75% | 140 | 21 V | 8 V | B |
| Example 15 | (1) | 15 | malonic acid | 100 | 2.65 | 75% | 140 | 14 V | 12 V | B |
| Example 16 | (1) | 15 | malonic acid | 300 | 2.65 | 75% | 140 | 6 V | 18 V | A |
| Example 17 | (1) | 15 | DBSA | 50 | −2 | 75% | 140 | 16 V | 12 V | B |
| Example 18 | (1) | 15 | DBSA | 100 | −2 | 75% | 140 | 6 V | 18 V | A |
| Example 19 | (1) | 15 | DBSA | 300 | −2 | 75% | 140 | 2 V | 21 V | A |
| Comparative Example 6 | (1) | 15 | none | 0 | — | 69% | 140 | 33 V | 3 V | D |
| Example 20 | (1) | 15 | malonic acid | 50 | 2.65 | 69% | 140 | 21 V | 8 V | B |
| Example 21 | (1) | 15 | malonic acid | 100 | 2.65 | 69% | 140 | 15 V | 12 V | A |
| Example 22 | (1) | 15 | malonic acid | 300 | 2.65 | 69% | 140 | 8 V | 15 V | A |
| Example 23 | (1) | 15 | DBSA | 50 | −2 | 69% | 140 | 16 V | 14 V | A |
| Example 24 | (1) | 15 | DBSA | 100 | −2 | 69% | 140 | 10 V | 15 V | A |
| Example 25 | (1) | 15 | DBSA | 300 | −2 | 69% | 140 | 3 V | 20 V | A |
| Comparative Example 7 | (1) | 15 | none | 0 | — | 64% | 140 | 40 V | 3 V | D |
| Example 26 | (1) | 15 | malonic acid | 50 | 2.65 | 64% | 140 | 21 V | 5 V | B |
| Example 27 | (1) | 15 | malonic acid | 100 | 2.65 | 64% | 140 | 19 V | 6 V | A |
| Example 28 | (1) | 15 | malonic acid | 300 | 2.65 | 64% | 140 | 14 V | 9 V | A |
| Example 29 | (1) | 15 | DBSA | 50 | −2 | 64% | 140 | 19 V | 13 V | A |

TABLE 2-continued

| | Fluorine-containing resin particles | | Acidic compound | | | TB ratio (%) | Drying temperature during charge transporting layer formation ° C. | Measurement result | | Image density unevenness |
|---|---|---|---|---|---|---|---|---|---|---|
| | Type | Number of COOH | Type | Amount (ppm) | pKa | | | ΔRP | ΔVH | |
| Example 30 | (1) | 15 | DBSA | 100 | −2 | 64% | 140 | 12 V | 17 V | A |
| Example 31 | (1) | 15 | DBSA | 300 | −2 | 64% | 140 | 11 V | 20 V | A |

TABLE 3

| | Fluorine-containing resin particles | | Acidic compound | | | TB ratio (%) | Drying temperature during charge transporting layer formation ° C. | Measurement result | | Image density unevenness |
|---|---|---|---|---|---|---|---|---|---|---|
| | Type | Number of COOH | Type | Amount (ppm) | pKa | | | ΔRP | ΔVH | |
| Comparative Example 8 | (1) | 15 | none | 0 | — | 64% | 120 | 35 V | 6 V | D |
| Example 32 | (1) | 15 | malonic acid | 50 | 2.65 | 64% | 120 | 20 V | 5 V | B |
| Example 33 | (1) | 15 | malonic acid | 100 | 2.65 | 64% | 120 | 14 V | 4 V | A |
| Example 34 | (1) | 15 | malonic acid | 300 | 2.65 | 64% | 120 | 12 V | 10 V | A |
| Example 35 | (1) | 15 | DBSA | 50 | −2 | 64% | 120 | 13 V | 16 V | A |
| Example 36 | (1) | 15 | DBSA | 100 | −2 | 64% | 120 | 9 V | 15 V | A |
| Example 37 | (1) | 15 | DBSA | 300 | −2 | 64% | 120 | 10 V | 21 V | A |
| Comparative Example 9 | (1) | 15 | none | 0 | — | 64% | 100 | 49 V | 3 V | D |
| Example 38 | (1) | 15 | malonic acid | 50 | 2.65 | 64% | 100 | 24 V | 5 V | B |
| Example 39 | (1) | 15 | malonic acid | 100 | 2.65 | 64% | 100 | 22 V | 6 V | B |
| Example 40 | (1) | 15 | malonic acid | 300 | 2.65 | 64% | 100 | 21 V | 9 V | B |
| Example 41 | (1) | 15 | DBSA | 50 | −2 | 64% | 100 | 24 V | 13 V | B |
| Example 42 | (1) | 15 | DBSA | 100 | −2 | 64% | 100 | 19 V | 17 V | A |
| Example 43 | (1) | 15 | DBSA | 300 | −2 | 64% | 100 | 17 V | 20 V | A |

An abbreviation in Tables 1 to 3 is shown below.
DBSA: Dodecylbenzenesulfonic acid
(Actual Machine Evaluation)
Image Forming Apparatus for Evaluation Photoconductors obtained in Example 2 and Comparative Example 2 are attached to Versant 180i Press that is manufactured by Fuji Xerox Co., Ltd., and includes a discharging unit that irradiates a surface of an electrophotographic photoconductor with a discharging light for discharging after transfer of a toner image and before charging.

This apparatus is used as an image forming apparatus for evaluation.
—Image Density Unevenness Evaluation—

Using the image forming apparatus for evaluation, 10,000 images having an image density of 30% are continuously output under conditions of 30° C. and 85% RH. Then, the copying machine is paused for 12 hours. Thereafter, one image having an image density of 30% is output again, and a density change of the image is visually observed.

As a result, when the image forming apparatus for evaluation including the photoconductor obtained in Example 2 is used, no change is found in the density of the obtained image. On the other hand, when the image forming apparatus for evaluation including the photoconductor obtained in Comparative Example 2 is used, a change in the density of the obtained image is found, and practical use is not durable.

From the above results, it can be seen that the photoconductors of Examples may prevent a decrease in the image density uniformity when image formation is continuously performed, then paused, and image formation is performed again.

It can be seen that Reference Example 1 is a photoconductor containing, in an outermost surface layer, fluorine-containing resin particles in which the number of carboxyl groups is more than 30 per $10^6$ carbon atoms, and a decrease in the image density uniformity does not occur.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoconductor comprising:
   a conductive substrate; and
   a photoconductive layer, wherein
   an outermost surface layer of the electrophotographic photoconductor contains a binder resin, a charge transporting material, fluorine-containing resin particles, and an acidic compound,
   the number of carboxyl groups in the fluorine-containing resin particles is 0 or more and 30 or less per $10^6$ carbon atoms of the fluorine-containing resin particles,
   in a case where charging and exposure of the electrophotographic photoconductor are repeated 10,000 times under conditions of a charging potential of −700V and an exposure intensity of 5 mJ/m$^2$, an absolute value $|RP_1-RP_{10000}|$ of a difference between a residual potential $RP_1$ after charging and exposure once and a residual potential $RP_{10000}$ after charging and exposure 10,000 times is 25 V or less, and
   the acidic compound is one or more selected from the group consisting of a phosphoric acid compound, a nitric acid compound, hydrogen chloride, a sulfonic acid compound in which an alkyl group having 1 or more and 20 or less carbon atoms is substituted or a hydrate thereof, a sulfonic acid compound which has a benzene ring, an alkylsulfonic acid having 1 or more or 6 or less carbon atoms or a hydrate thereof, and a carboxylic acid compound.

2. The electrophotographic photoconductor according to claim 1, wherein
   a content of the charge transporting material in the outermost surface layer is 59 mass % or more and 72 mass % or less with respect to the binder resin.

3. The electrophotographic photoconductor according to claim 2, wherein
   a content of the charge transporting material in the outermost surface layer is 61 mass % or more and 69 mass % or less with respect to the binder resin.

4. The electrophotographic photoconductor according to claim 3, wherein
   an acid dissociation constant pKa of the acidic compound is −2.8 or more and 2.5 or less.

5. The electrophotographic photoconductor according to claim 4, wherein
   the acid dissociation constant pKa of the acidic compound is −2 or more and 2.5 or less.

6. The electrophotographic photoconductor according to claim 2, wherein
   an acid dissociation constant pKa of the acidic compound is −2.8 or more and 2.5 or less.

7. The electrophotographic photoconductor according to claim 6, wherein
   the acid dissociation constant pKa of the acidic compound is −2 or more and 2.5 or less.

8. The electrophotographic photoconductor according to claim 1, wherein
   an acid dissociation constant pKa of the acidic compound is −2.8 or more and 2.5 or less.

9. The electrophotographic photoconductor according to claim 8, wherein
   the acid dissociation constant pKa of the acidic compound is −2 or more and 2.5 or less.

10. The electrophotographic photoconductor according to claim 1, wherein
    the acidic compound is at least one selected from the group consisting of a sulfonic acid compound, a carboxylic acid compound, a phosphoric acid compound, and a nitric acid compound.

11. The electrophotographic photoconductor according to claim 10, wherein
    the sulfonic acid compound is a sulfonic acid compound having a benzene ring, and
    the carboxylic acid compound is a carboxylic acid compound having 2 or more and 4 or less carboxyl groups.

12. The electrophotographic photoconductor according to claim 1, wherein
    the acidic compound is at least one selected from the group consisting of a sulfonic acid compound and a carboxylic acid compound.

13. The electrophotographic photoconductor according to claim 1, wherein
    a content of the acidic compound is 25 ppm or more and 1000 ppm or less with respect to the outermost surface layer.

14. A process cartridge comprising:
    the electrophotographic photoconductor according to claim 1, wherein
    the process cartridge is configured to be attached to and detached from an image forming apparatus.

15. An image forming apparatus comprising:
    the electrophotographic photoconductor according to claim 1;
    a charging unit configured to charge a surface of the electrophotographic photoconductor;
    an electrostatic latent image forming unit configured to form an electrostatic latent image on the surface of the electrophotographic photoconductor charged by the charging unit;
    a developing unit configured to develop the electrostatic latent image formed on the surface of the electrophotographic photoconductor with a developer containing a toner to form a toner image; and
    a transfer unit configured to transfer the toner image onto a surface of a recording medium.

16. The image forming apparatus according to claim 15, further comprising:
    a discharging unit configured to irradiate the surface of the electrophotographic photoconductor with a discharging light for discharging after transfer of the toner image and before charging.

17. An electrophotographic photoconductor comprising:
    a conductive substrate; and
    a photoconductive layer, wherein
    an outermost surface layer of the electrophotographic photoconductor contains a binder resin, a charge transporting material, fluorine-containing resin particles, and an acidic compound,
    the number of carboxyl groups in the fluorine-containing resin particles is 0 or more and 30 or less per $10^6$ carbon atoms of the fluorine-containing resin particles, and
    a content of the charge transporting material in the outermost surface layer is 59 mass % or more and 72 mass % or less with respect to the binder resin.

18. The electrophotographic photoconductor according to claim 1, wherein
    the outermost surface layer further contains a fluorine-based graft polymer.

19. The electrophotographic photoconductor according to claim 17, wherein
the acidic compound is one or more selected from the group consisting of a phosphoric acid compound, a nitric acid compound, hydrogen chloride, a sulfonic acid compound in which an alkyl group having 1 or more and 20 or less carbon atoms is substituted or a hydrate thereof, a sulfonic acid compound which has a benzene ring, an alkylsulfonic acid having 1 or more or 6 or less carbon atoms or a hydrate thereof, and a carboxylic acid compound.

20. The electrophotographic photoconductor according to claim 17, wherein
an acid dissociation constant pKa of the acidic compound is −2.8 or more and 2.5 or less.

21. The electrophotographic photoconductor according to claim 20, wherein
the acid dissociation constant pKa of the acidic compound is −2 or more and 2.5 or less.

\* \* \* \* \*